United States Patent [19]

Hatori

[11] Patent Number: 4,940,304
[45] Date of Patent: Jul. 10, 1990

[54] OPTICAL DEFLECTING APPARATUS

[75] Inventor: Masami Hatori, Kanagawa, Japan

[73] Assignee: Fuji Photo Film Co., Ltd., Kanagawa, Japan

[21] Appl. No.: 384,113

[22] Filed: Jul. 24, 1989

Related U.S. Application Data

[63] Continuation of Ser. No. 201,976, Jun. 3, 1988, abandoned.

[30] Foreign Application Priority Data

Jun. 3, 1987 [JP] Japan ............................... 62-139472
Jun. 25, 1987 [JP] Japan ............................... 62-158610
Jun. 25, 1987 [JP] Japan ............................... 62-158611

[51] Int. Cl.$^5$ .............................................. G02B 6/10
[52] U.S. Cl. ............................... 350/96.13; 350/96.14
[58] Field of Search ................. 350/96.13, 96.14, 96.15

[56] References Cited

U.S. PATENT DOCUMENTS 4,595,253 6/1986 Yamashita et al. ............... 350/96.13
4,815,802 3/1989 Nakamura ......................... 350/96.13

FOREIGN PATENT DOCUMENTS 0192232 10/1984 Japan ............................... 350/96.13
527973 1/1975 U.S.S.R. ............................ 350/96.13

Primary Examiner—Frank Gonzalez
Assistant Examiner—Phan T. Heartney
Attorney, Agent, or Firm—Sughrue, Mion, Zinn, Macpeak & Seas

[57] ABSTRACT

An optical deflecting apparatus comprises optical deflectors each having a first generator for generating a first surface acoustic wave which advances to intersect an optical path of a guided optical wave advancing in an optical waveguide and deflects the guided optical wave, and a second generator for generating a second surface acoustic wave which advances to intersect the optical path of the guided and deflected optical wave and deflects the guided and deflected optical wave in a direction that amplifies the deflection. The first and second surface acoustic wave generators are formed to continuously change the frequencies of the first and second surface acoustic waves and the directions of advance thereof while satisfying specific conditions. The optical waveguides of the optical deflectors are disposed so that the optical waves radiated out of the optical waveguides scan in a line on a predetermined surface, and scanning extremities of the adjacent radiated optical waves adjoin each other.

24 Claims, 10 Drawing Sheets

F I G. 1
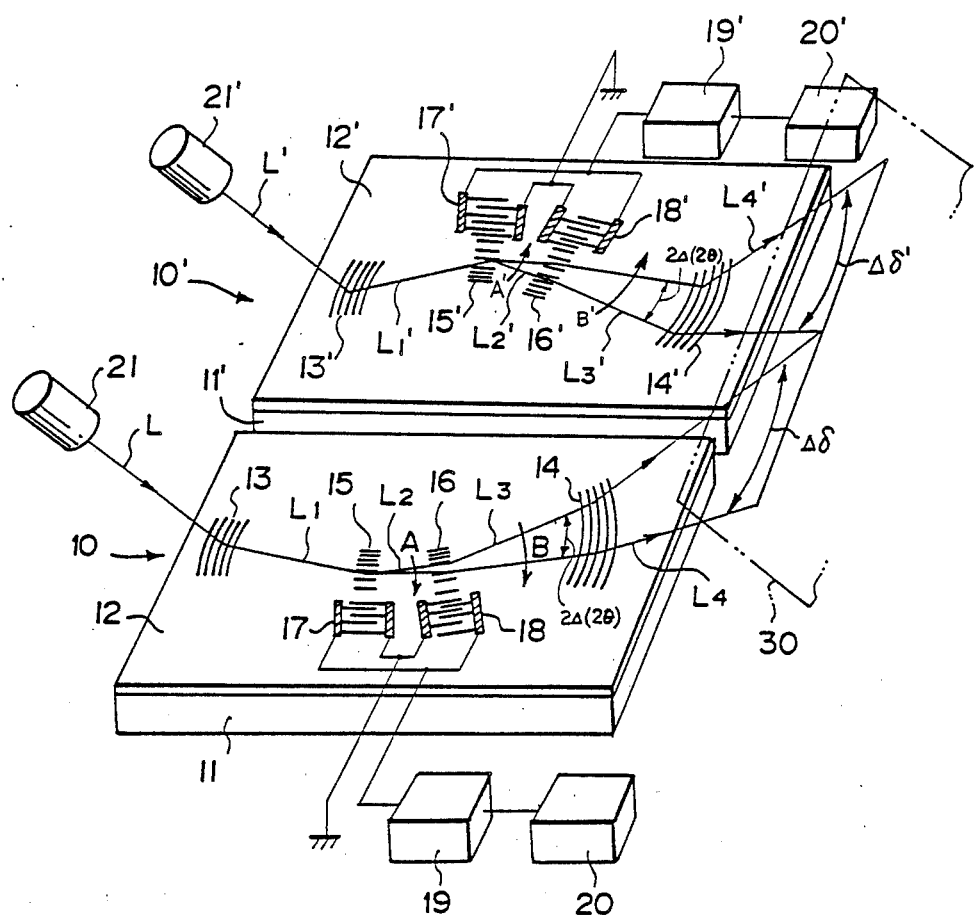

F I G .12
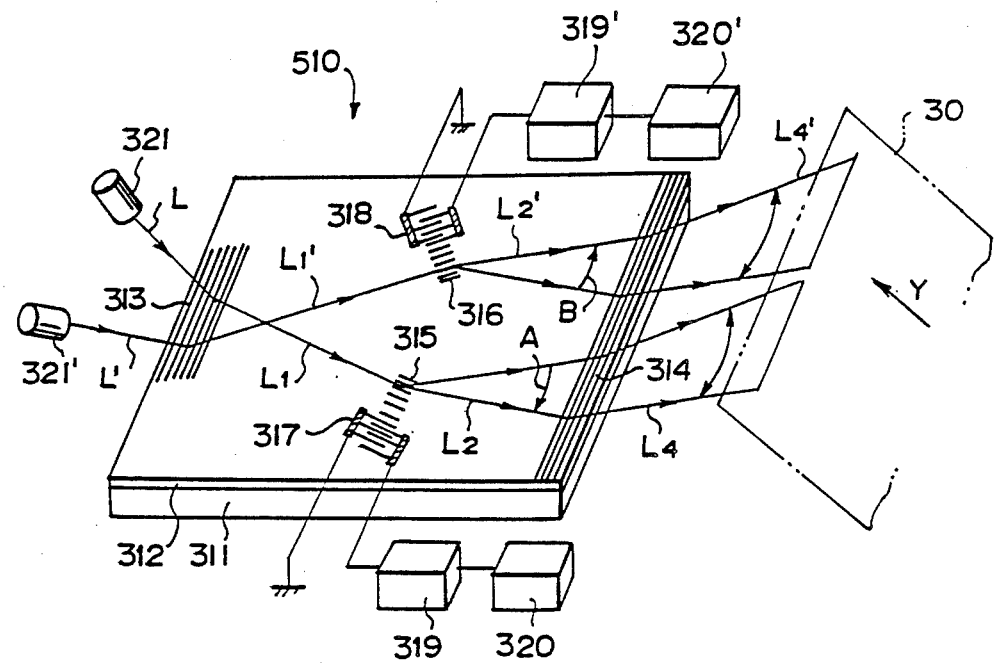

OPTICAL DEFLECTING APPARATUS

This is a continuation of application Ser. No. 201,976, filed Jun. 3, 1988, now abandoned.

BACKGROUND OF THE INVENTION

1. Field of the Invention

This invention relates to an optical deflecting apparatus for generating surface acoustic waves in an optical waveguide and deflecting an optical wave or optical waves guided through the optical waveguide by diffracting actions of the surface acoustic waves. This invention particularly relates to an optical deflecting apparatus wherein a wide deflection angle range is obtained.

2. Description of the Prior Art

As disclosed in, for example, Japanese Unexamined Patent Publication No. 61(1986)-183626, there has heretofore been known an optical deflecting apparatus wherein light is made to enter an optical waveguide formed of a material allowing propagation of a surface acoustic wave therethrough, a surface acoustic wave is generated in a direction intersecting the guided optical wave advancing inside of the optical waveguide to effect Bragg diffraction of the guided optical wave by the surface acoustic wave, and the frequency of the surface acoustic wave is continuously changed to continuously change the angle of diffraction (deflection angle) of the guided optical wave. The optical deflecting apparatus of this type is advantageous in that the apparatus can be fabricated small and light and has high reliability because of the absence of mechanical operating elements as compared with a mechanical type optical deflector such as a galvanometer mirror or a polygon mirror, and an optical deflector using an optical deflecting device such as an electro-optic deflector (EOD) or an acousto-optic deflector (AOD).

However, the aforesaid optical deflecting apparatus has the drawback that the deflection angle cannot be adjusted to be large. Specifically, with the optical deflecting apparatus using the optical waveguide, the optical deflection angle is approximately proportional to the frequency of the surface acoustic wave, and therefore the frequency of the surface acoustic wave must be changed up to a very large value in order to obtain a large deflection angle. Thus it is necessary to change the frequency of the surface acoustic wave over a wide band. Also, in order to satisfy the Bragg condition, it is necessary to control the angle of incidence of the guided optical wave upon the surface acoustic wave by continuously changing (steering) the direction of advance of the surface acoustic wave.

In order to satisfy the aforesaid requirements, as disclosed in, for example, the aforesaid Japanese Unexamined Patent Publication No. 61(1986)-183626, there has heretofore been proposed an optical deflecting apparatus wherein a plurality of interdigital transducers (hereinafter abbreviated as IDT) generating surface acoustic waves, the frequency of which changes continuously in frequency bands different from one another, are disposed so that the directions of generation of the surface acoustic waves are different from one another, and the respective IDTs are operated through switching.

However, the proposed optical deflecting apparatus having the aforesaid configuration has the drawback that the diffraction efficiency decreases around the cross-over frequency of the surface acoustic waves generated by the respective IDTs, and therefore the optical amount of the deflected optical wave fluctuates in accordance with the deflection angle.

Also, with the aforesaid configuration, the IDT which bears the portion of a large deflection angle must ultimately be constituted to be able to generate the surface acoustic wave of a very high frequency. This problem will be described below. The deflection angle o of the guided optical wave caused by the acousto-optic interaction between the surface acoustic wave and the guided optical wave is expressed as $\alpha = 2\theta$ wherein $\theta$ denotes the angle of incidence of the guided optical wave with respect to the direction of advance of the surface acoustic wave. Also, the formula $$2\theta = 2\sin^{-1}(\lambda/2Ne \cdot \Lambda) \quad (1)$$
$$\approx \lambda/Ne \cdot \Lambda$$
$$= \lambda \cdot f/Ne \cdot v$$

applies wherein $\lambda$ and Ne respectively denote the wavelength and the effective refractive index of the guided optical wave, and $\Lambda$, f and v respectively denote the wavelength, the frequency and the velocity of the surface acoustic wave. Therefore, a deflection angle range $\Delta(2\theta)$ is expressed as $$\Delta(2\theta) = \Delta f \cdot \lambda/Ne \cdot v.$$

For example, in order to obtain a deflection angle range $\Delta(2\theta)$ equal to 10° in the case where $\lambda = 0.78$ μm, Ne = 2.2 and v = 3,500 m/s, it is necessary that the frequency range $\Delta f$ of the surface acoustic wave, i.e. the frequency band of the high frequency applied to the IDT, be $\Delta f = 1.72$ GHz. In the case where said frequency band is of one octave so that adverse effects of the second order diffracted optical wave component can be avoided, the center frequency f0 is equal to 2.57 GHz and the maximum frequency f2 is equal to 3.43 GHz. The period $\Lambda$ of the IDT that gives said maximum frequency f2 is equal to 1.02 μm, and the line width W of the IDT finger is equal to $\Lambda/4 = 0.255$ μm.

With the current photolithography and electron beam drawing processes which are popular techniques for forming the IDT, the possible line widths are limited respectively to approximately 0.8 μm and approximately 0.5 μm. Therefore, it is not always possible to form an IDT having the very small line width mentioned above. Even if such an IDT having the very small line width mentioned above could be formed in the future, a driver for generating a high frequency of approximately 3.43 GHz cannot always be manufactured or can only be done at a very high cost. Also, it is not always possible to apply a high voltage to such an IDT. Further, in the case where the frequency of the surface acoustic wave is increased as mentioned above, the wavelength of the surface acoustic wave naturally becomes short, and therefore the surface acoustic wave is readily absorbed by the optical waveguide and the diffraction efficiency deteriorates.

On the other hand, an optical deflecting apparatus wherein, instead of operating a plurality of IDTs through switching as mentioned above, a single IDT is constituted as a curved-finger chirped IDT in which the transducer finger line width is changed continuously and the respective transducer fingers are in a circular arc shape, and the frequency of the surface acoustic wave and the direction of advance thereof are changed continuously over a wide range by the single IDT is disclosed in IEEE Transactions on Circuits and Systems, Vol. CAS- 26, No. 12, p. 1072, "Guided-Wave Acoustooptic Bragg Modulators for Wide-Band Integrated Optic Communications and Signal Processing" by C. S. Tsai. With the disclosed configuration, though the drawback with regard to fluctuations of the optical amount of the optical wave in accordance with the deflection angle can be eliminated, the frequency of the surface acoustic wave must still be adjusted to be very high, and therefore the same problems as mentioned above occur.

Accordingly, the applicant proposed in Japanese Patent Application No. 61(1986)-283646 an optical deflecting apparatus wherein no fluctuations in the optical amount of the optical wave as mentioned above are caused, and a wide deflection angle range is obtained even though the frequency of the surface acoustic wave is not adjusted to be very high. The proposed optical deflecting apparatus comprises:

(i) an optical waveguide formed of a material allowing propagation of surface acoustic waves therethrough, (ii) a first surface acoustic wave generating means for generating a first surface acoustic wave, which advances in a direction intersecting an optical path of a guided optical wave advancing inside of said optical waveguide and diffracts and deflects said guided optical wave, in said optical waveguide, and (iii) a second surface acoustic wave generating means for generating a second surface acoustic wave, which advances in a direction intersecting the optical path of said guided and diffracted optical wave and diffracts and deflects said guided and diffracted optical wave in a direction that amplifies the deflection caused by said diffraction, in said optical waveguide, wherein said first surface acoustic wave generating means and said second surface acoustic wave generating means are formed to continuously change the frequencies of said first surface acoustic wave and said second surface acoustic wave and the directions of advance thereof while satisfying the conditions of $$lk1 + lK1 = lk2 \text{ and}$$

$$lk2 + lK2 = lk3$$

wherein lk1 and lk2 respectively denote wave vectors of the guided optical wave before and after being diffracted by said first surface acoustic wave, lk3 denotes a wave vector of the guided optical wave after being diffracted by said second surface acoustic wave, and lK1 and lK2 respectively denote wave vectors of said first surface acoustic wave and said second surface acoustic wave.

The first surface acoustic wave generating means and the second surface acoustic wave generating means may each be constituted by, for example, a combination of a tilted-finger chirped IDT, in which the transducer finger intervals are changed stepwise and the directions of the transducer fingers are changed stepwise, with a driver for applying an alternating voltage the frequency of which changes continuously to the tilted-finger chirped IDT.

With the aforesaid configuration wherein the guided optical wave deflected by the first surface acoustic wave is again deflected by the second surface acoustic wave, a wide deflection angle range can be obtained as a whole even though the frequency bands of the first surface acoustic wave and the second surface acoustic wave are not adjusted to be so wide.

SUMMARY OF THE INVENTION

The primary object of the present invention is to provide an optical deflecting apparatus wherein a deflection angle range wider than the deflection angle range possible with the optical deflecting apparatus as proposed in Japanese Patent Application No. 61(1986)-283646 is obtained.

Another object of the present invention is to provide an optical deflecting apparatus wherein no fluctuations in the optical amount of the optical wave as mentioned above are caused, and a wide deflection angle range is obtained even though the frequency of the surface acoustic wave is not adjusted to be very high.

A further object of the present invention is to provide an optical deflecting apparatus which is usable for simultaneous recording or reading of two images and wherein a wide deflection angle range is obtained for the recording or reading of each image.

The present invention provides a first optical deflecting apparatus comprising a plurality of optical deflectors, each of which is provided with:

(i) an optical waveguide formed of a material allowing propagation of surface acoustic waves therethrough, (ii) a first surface acoustic wave generating means for generating a first surface acoustic wave, which advances in a direction intersecting an optical path of a guided optical wave advancing inside of said optical waveguide and diffracts and deflects said guided optical wave, in said optical waveguide, and (iii) a second surface acoustic wave generating means for generating a second surface acoustic wave, which advances in a direction intersecting the optical path of said guided and diffracted optical wave and diffracts and deflects said guided and diffracted optical wave in a direction that amplifies the deflection caused by said diffraction, in said optical waveguide, wherein said first surface acoustic wave generating means and said second surface acoustic wave generating means are formed to continuously change the frequencies of said first surface acoustic wave and said second surface acoustic wave and the directions of advance thereof while satisfying the conditions of $$lk1 + lK1 = lk2, \text{ and}$$

$$lk2 + lK2 = lk3$$

wherein lk1 and lk2 respectively denote wave vectors of the guided optical wave before and after being diffracted by said first surface acoustic wave, lk3 denotes a wave vector of the guided optical wave after being diffracted by said second surface acoustic wave, and lK1 and lK2 respectively denote wave vectors of said first surface acoustic wave and said second surface acoustic wave, said optical waveguides of said optical deflectors being disposed so that the optical waves radiated out of said optical waveguides scan in a line with respect to each other on a predetermined surface, and scanning extremities of the adjacent radiated optical waves adjoin each other.

The present invention also provides a second optical deflecting apparatus comprising:
  (i) an optical waveguide formed of a material allowing propagation of surface acoustic waves therethrough,
  (ii) a first surface acoustic wave generating means for generating a first surface acoustic wave, which advances in a direction intersecting an optical path of a first guided optical wave advancing inside of said optical waveguide and diffracts and deflects said first guided optical wave, in said optical waveguide, and
  (iii) a second surface acoustic wave generating means for generating a second surface acoustic wave, which advances in a direction intersecting an optical path of a second guided optical wave advancing inside of said optical waveguide and diffracts and deflects said second guided optical wave, in said optical waveguide,
    wherein said first surface acoustic wave generating means and said second surface acoustic wave generating means are disposed so that said first guided optical wave and said second guided optical wave radiated out of said optical waveguide scan in a line with respect to each other on a predetermined surface, and a scanning extremity of said first guided and radiated optical wave adjoin a scanning extremity of said second guided and radiated optical wave.

The present invention further provides a third optical deflecting apparatus comprising:
  (i) an optical waveguide formed of a material allowing propagation of surface acoustic waves therethrough,
  (ii) a first surface acoustic wave generating means for generating a first surface acoustic wave, which advances in a direction intersecting an optical path of a first guided optical wave advancing inside of said optical waveguide and diffracts and deflects said first guided optical wave, in said optical waveguide,
  (iii) a second surface acoustic wave generating means for generating a second surface acoustic wave, which advances in a direction intersecting an optical path of a second guided optical wave advancing inside of said optical waveguide and diffracts and deflects said second guided optical wave, in said optical waveguide,
  (iv) a third surface acoustic wave generating means for generating a third surface acoustic wave, which advances in a direction intersecting the optical path of said first guided optical wave diffracted by said first surface acoustic wave and diffracts and deflects said first guided and diffracted optical wave in a direction that amplifies the deflection caused by said diffraction, in said optical waveguide, and
  (v) a fourth surface acoustic wave generating means for generating a fourth surface acoustic wave, which advances in a direction intersecting the optical path of said second guided optical wave diffracted by said second surface acoustic wave and diffracts and deflects said second guided and diffracted optical wave in a direction that amplifies the deflection caused by said diffraction, in said optical waveguide, wherein said first surface acoustic wave generating means and said third surface acoustic wave generating means are formed to continuously change the frequencies of said first surface acoustic wave and said third surface acoustic wave and the directions of advance thereof while satisfying the conditions of $lk1 + lK1 = lk2$, and $lk2 + lK2 = lk3$ wherein $lk1$ and $lk2$ respectively denote wave vectors of said first guided optical wave before and after being diffracted by said first surface acoustic wave, $lk3$ denotes a wave vector of said first guided optical wave after being diffracted by said third surface acoustic wave, and $lk1$ and $lk2$ respectively denote wave vectors of said first surface acoustic wave and said third surface acoustic wave,
    said second surface acoustic wave generating means and said fourth surface acoustic wave generating means are formed to continuously change the frequencies of said second surface acoustic wave and said fourth surface acoustic wave and the directions of advance thereof while satisfying the conditions of $lk4 + lK3 = lk5$, and $lk5 + lK4 = lk6$ wherein $lk4$ and $lk5$ respectively denote wave vectors of said second guided optical wave before and after being diffracted by said second surface acoustic wave, $lk6$ denotes a wave vector of said second guided optical wave after being diffracted by said fourth surface acoustic wave, and $lK3$ and $lK4$ respectively denote wave vectors of said second surface acoustic wave and said fourth surface acoustic wave, and
    said first surface acoustic wave generating means, said second surface acoustic wave generating means, said third surface acoustic wave generating means, and said fourth surface acoustic wave generating means are disposed so that said first guided optical wave and said second guided optical wave radiated out of said optical waveguide scan in a line with respect to each other on a predetermined surface, and a scanning extremity of said first guided and radiated optical wave adjoin a scanning extremity of said second guided and radiated optical wave.

The present invention still further provides a fourth optical deflecting apparatus wherein said first surface acoustic wave generating means and said second surface acoustic wave generating means as defined for the aforesaid second optical deflecting apparatus are disposed so that said first guided optical wave and said second guided optical wave radiated out of said optical waveguide scan without overlapping each other on a predetermined surface.

The present invention also provides a fifth optical deflecting apparatus wherein said first surface acoustic wave generating means, said second surface acoustic wave generating means, said third surface acoustic wave generating means, and said fourth surface acoustic wave generating means as defined for the aforesaid third optical deflecting apparatus are disposed so that said first guided optical wave and said second guided optical wave radiated out of said optical waveguide scan without overlapping each other on a predetermined surface.

The first surface acoustic wave generating means, the second surface acoustic wave generating means, the third surface acoustic wave generating means, and the fourth surface acoustic wave generating means may each be constituted by, for example, a combination of a tilted-finger chirped IDT, in which the transducer finger intervals are changed stepwise and the directions of the transducer fingers are changed stepwise, with a driver for applying an alternating voltage the frequency of which changes continuously to the tilted-finger chirped IDT.

In the case where the optical waves are deflected by the first optical deflecting apparatus in accordance with the present invention, scanning lines of the optical waves, which are radiated out of the respective optical waveguides, on the predetermined surface, i.e. on the scanning surface which is to be scanned, join together in a line. Therefore, as for the scanning width, the same effect as the effect of scanning of a single optical wave by use of an optical deflecting apparatus having a wider deflection angle range is obtained.

In the case where the optical waves are deflected by the second optical deflecting apparatus in accordance with the present invention wherein the first surface acoustic wave generating means and the second surface acoustic wave generating means are disposed in the manner as mentioned above, scanning lines of the optical waves, which are radiated out of the optical waveguide, on the predetermined surface, i.e. on the scanning surface which is to be scanned, join together in a line. Therefore, as for the scanning width, the same effect as the effect of scanning of a single optical wave by use of an optical deflecting apparatus having a wider deflection angle range is obtained. Therefore, a wide deflection angle range can be obtained as a whole even though the frequency bands of the first surface acoustic wave and the second surface acoustic wave are not adjusted to be so wide.

The same thing as the second optical deflecting apparatus applies also to the third optical deflecting apparatus in accordance with the present invention. Also, with the third optical deflecting apparatus in accordance with the present invention wherein the first (or second) guided optical wave deflected by the first (or second) surface acoustic wave is again deflected by the third (or fourth) surface acoustic wave, and thus the deflection angles of the guided optical waves before being combined together are increased, a deflection angle range wider than the deflection angle range possible with the second optical deflecting apparatus can be obtained.

In the case where the optical waves are deflected by the fourth optical deflecting apparatus in accordance with the present invention wherein the first surface acoustic wave generating means and the second surface acoustic wave generating means are disposed in the manner as mentioned above, the two optical waves radiated out of the optical waveguide respectively scan different portions on the predetermined surface, i.e. on the scanning surface which is to be scanned. Therefore, different images can be recorded or read by use of the respective optical waves radiated out of the optical waveguide. At this time, the respective optical waves are deflected by different surface acoustic waves, and therefore the overall deflection angle range achieved by each surface acoustic wave can be utilized for the recording or the reading of a single image.

The same thing as the fourth optical deflecting apparatus applies also to the fifth optical deflecting apparatus in accordance with the present invention. Also, with the fifth optical deflecting apparatus in accordance with the present invention wherein the first (or second) guided optical wave deflected by the first (or second) surface acoustic wave is again deflected by the third (or fourth) surface acoustic wave, the deflection angle range for the recording or the reading of a single image becomes wider than the deflection angle range possible with the fourth optical deflecting apparatus.

With the first optical deflecting apparatus in accordance with the present invention, the guided optical waves deflected by the surface acoustic waves are again deflected by the different surface acoustic waves, and the guided optical waves thus deflected are combined with each other to obtain a wide deflection angle range. With the second and third optical deflecting apparatuses in accordance with the present invention, the two guided optical waves deflected by the surface acoustic waves are combined with each other on the scanning surface. Also, with the third optical deflecting apparatus in accordance with the present invention, the guided optical waves deflected by the surface acoustic waves are again deflected by the different surface acoustic waves to obtain a wider deflection angle range. Therefore, with the first, second and third optical deflecting apparatuses in accordance with the present invention, the optical wave scanning recording or the optical wave scanning read-out can be carried out accurately. Also, since a very wide deflection angle range can be obtained as mentioned above, the size of the optical scanning recording apparatus or the optical scanning readout apparatus can be made small by shortening the distance between the optical deflecting apparatus and the scanning surface which is to be scanned.

Also, with the second and third optical deflecting apparatuses in accordance with the present invention wherein the two optical waves which are to be combined together on the predetermined surface are guided and deflected in a single common optical waveguide, adjustment of the scanning positions of the two optical waves can be carried out accurately and easily.

The fourth and fifth optical deflecting apparatuses in accordance with the present invention are constituted so that the two guided optical waves deflected by the surface acoustic waves scan independently of each other on the scanning surface. Also, the fifth optical deflecting apparatus is constituted so that the guided optical waves once deflected by the surface acoustic waves are further deflected by the different surface acoustic waves. Therefore, the deflection angle range per image can be substantially increased to two times with the fourth optical deflecting apparatus in accordance with the present invention and to four times with the fifth optical deflecting apparatus in accordance with the present invention as compared with the case wherein the deflection angle range of a single optical wave is divided into two segments for recording or reading two images. Accordingly, with the fourth and fifth optical deflecting apparatuses in accordance with the present invention, recording or reading of large images can be carried out. Also, since a very wide deflection angle range can be obtained, the size of the optical scanning recording apparatus or the optical scanning read-out apparatus can be made small by shortening the distance between the optical deflecting apparatus and the scanning surface which is to be scanned.

Also, with the fourth and fifth optical deflecting apparatuses in accordance with the present invention wherein the two optical waves which are to be scanned simultaneously on the predetermined surface are guided and deflected in a single common optical waveguide, adjustment of the scanning positions of the two optical waves can be carried out accurately and easily.

Also, with the first to fifth optical deflecting apparatuses in accordance with the present invention wherein a wide deflection angle range can be obtained even though the frequencies of the respective surface acoustic waves are not adjusted to be markedly high, it is not necessary to adjust the line widths of the IDTs to be extremely small in the case where the IDTs are employed as the surface acoustic wave generating means, and the IDTs for use as the surface acoustic wave generating means can be made easily with the current technique. Also, because of the above, it is not necessary to adjust the frequency of the alternating voltage applied to the IDTs to be markedly high, and therefore the driver for the IDTs can be fabricated easily and at a low cost.

BRIEF DESCRIPTION OF THE DRAWINGS

FIG. 1 is a schematic perspective view showing an embodiment of the first optical deflecting apparatus in accordance with the present invention, FIG. 12 is a schematic perspective view showing an embodiment of the fourth optical deflecting apparatus in accordance with the present invention.

DESCRIPTION OF THE PREFERRED EMBODIMENTS

Figure 2:
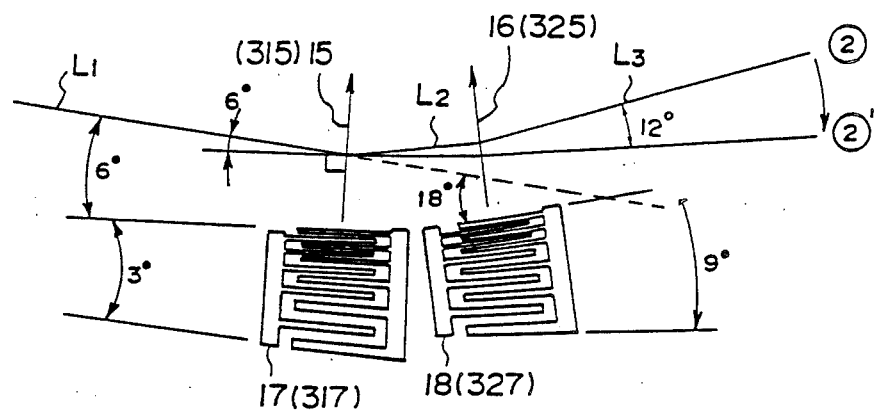
FIG. 2 is an enlarged plan view showing a part of the embodiment shown in FIG. 1, FIGS. 3A and 3B are explanatory views showing the condition of optical wave deflection in the embodiment shown in FIG. 1.

The present invention will hereinbelow be described in further detail with reference to the accompanying drawings.

With reference to FIG. 1, an optical deflecting apparatus comprises an optical deflector 10, and an optical deflector 10' of the type similar to the optical deflector 10 and disposed side by side with the optical deflector 10. First, the optical deflector 10 will be described hereinbelow. The optical deflector 10 comprises an optical waveguide 12 formed on a substrate 11, a focusing grating coupler (hereinafter abbreviated as FGC) 13 for entry of the optical wave which is formed on the optical waveguide 12, and an FGC 14 for radiation of the optical wave. The optical deflector 10 also comprises a first tilted-finger chirped interdigital transducer (the interdigital transducer is hereinbelow abbreviated as IDT) 17 and a second tilted-finger chirped IDT 18 for generating a first surface acoustic wave 15 and a second surface acoustic wave 16 respectively, which advance in directions intersecting the optical path of the guided optical wave advancing between the FGC 13 and the FGC 14, a high-frequency amplifier 19 for applying a high-frequency alternating voltage to the first tilted-finger chirped IDT 17 and the second tilted-finger chirped IDT 18, and a sweeper 20 for continuously changing (sweeping) the frequency of the alternating voltage.

In this embodiment, by way of example, the substrate 11 is formed of a LiNbO$_3$ wafer, and the optical waveguide 12 is formed by overlaying a Ti diffusion film on the surface of the wafer. As the substrate 11, it is also possible to use a crystal substrate formed of sapphire, Si or the like. Besides the Ti diffusion, the optical waveguide 12 may also be formed by sputtering or vacuum evaporation of a different material onto the surface of the substrate 11. Various optical waveguides are described in detail in, for example, T. Tamir, "Integrated Optics", Topics in Applied Physics, Vol. 7, Springer-Verlag, 1975, and Nishibara, et al., "Integrated Optical Circuit", Ohm, 1985. In the present invention, any of the known optical waveguides may be used as the optical waveguide 12. However, the optical waveguide 12 must be formed of a material such as the Ti diffusion film which allows propagation of the surface acoustic waves therethrough. The optical waveguide 12 may also be constituted by two or more layers.

The first tilted-finger chirped IDT 17 and the second tilted-finger chirped IDT 18 may be formed by, for example, coating a positive type electron beam resist onto the surface of the optical waveguide 12, depositing a thin Au conductive film by vacuum evaporation onto the positive type electron beam resist, drawing a transducer pattern with an electron beam, removing the thin Au film, carrying out development, depositing a thin Cr film and a thin Al film by vacuum evaporation, and then carrying out lift-off in an organic solvent. In the case where the substrate 11 and the optical waveguide 12 are made of a piezo-electric material, the first surface acoustic wave 15 and the second surface acoustic wave 16 can also be generated when the first tilted-finger chirped IDT 17 and the second tilted finger chirped IDT 18 are disposed directly inside of the optical waveguide 12 or on the substrate 11. In other cases, a piezoelectric thin film of ZnO or the like may be formed at a part of the substrate 11 or at a part of the optical waveguide 12 by vacuum evaporation, sputtering, or the like, and the first tilted-finger chirped IDT 17 and the second tilted-finger chirped IDT 18 may be disposed on the piezoelectric thin film.

An optical wave L which is to be deflected is emitted by a light source 21 constituted by a semiconductor laser or the like toward the FGC 13. The optical wave L (divergent wave) is collimated and taken into the optical waveguide 12 by the FGC 13, and is guided inside of the optical waveguide 12. The guided optical wave L1 is diffracted (Bragg diffraction) as shown by the acousto-optic interaction with the first surface acoustic wave 15 generated by the first tilted-finger chirped IDT 17. The guided optical wave L2 thus diffracted and deflected is then diffracted in a direction that amplifies the aforesaid deflection by the acousto-optic interaction with the second surface acoustic wave 16 generated by the second tilted-finger chirped IDT 18. Also, the frequency of the alternating voltage applied to the first tilted-finger chirped IDT 17 is continuously changed as mentioned above, and therefore the frequency of the first surface acoustic wave 15 is changed continuously. As is clear from the Formula (1) shown above, the deflection angle of the guided optical wave L2 after being diffracted by the first surface acoustic wave 15 is approximately proportional to the frequency of the first surface acoustic wave 15. Therefore, as the frequency of the first surface acoustic wave 15 is changed as mentioned above, the guided optical wave L2 is deflected continuously as indicated by the arrow A. The guided optical wave L2 is then deflected by the second surface acoustic wave 16. Also the frequency of the second surface acoustic wave 16 is changed continuously as in the case of the first surface acoustic wave 15, and therefore the guided optical wave L3 after the passage through the second surface acoustic wave 16 is deflected continuously as indicated by the arrow B. The guided optical wave L3 is radiated by the FGC 14 out of the optical waveguide 12, and is converged into a single spot by the converging effects of the FGC 14.

The deflection angle range $2\Delta(2\theta)$ of the guided optical wave L3 will be described hereinbelow with reference to FIG. 2. FIG. 2 shows the detailed shapes and the arrangement conditions of the first tilted-finger chirped IDT 17 and the second tilted-finger chirped IDT 18. With reference to FIG. 2, the first tilted-finger chirped IDT 17 and the second tilted-finger chirped IDT 18 are each formed so that intervals among the transducer fingers are changed stepwise in a constant change ratio and the directions of the transducer fingers are changed stepwise in a constant change ratio. Both the first tilted-finger chirped IDT 17 and the second tilted-finger chirped IDT 18 are disposed so that the side with the smallest transducer finger interval, i.e. the upper edge side in FIG. 2, faces the guided optical wave side. As the applied voltage is swept as mentioned above, the upper edge sides of the first tilted-finger chirped IDT 17 and the second tilted-finger chirped IDT 18 respectively generate the first surface acoustic wave 15 and the second surface acoustic wave 16 of the maximum frequency $f_2 = 2$ GHz, and the lower edge sides thereof respectively generate the first surface acoustic wave 15 and the second surface acoustic wave 16 of the minimum frequency $f_1 = 1$ GHz. The first tilted-finger chirped IDT 17 has such a shape that the transducer finger on the upper edge side and the transducer finger on the lower edge side are tilted by 3° with respect to each other, and is disposed so that the transducer finger on the upper edge side makes an angle of 6° with respect to the direction of advance of the guided optical wave L1, and the transducer finger on the lower edge side makes an angle of 3° with respect to the direction of advance of the guided optical wave L1. On the other hand, the second tilted-finger chirped IDT 18 has such a shape that the transducer finger on the upper edge side and the transducer finger on the lower edge side are tilted by 9° with respect to each other, and is disposed so that the transducer finger on the upper edge side makes an angle of 18° with respect to the direction of advance of the guided optical wave L1, and the transducer finger on the lower edge side makes an angle of 9° with respect to the direction of advance of the guided optical wave L1. Grounding electrodes of the first tilted-finger chirped IDT 17 and the second tilted-finger chirped IDT 18 may be formed integrally with each other. Also, the tilted-finger chirped IDTs as mentioned above are described in detail in, for example, the aforesaid literature of C. S. Tsai.

Figure 3A:
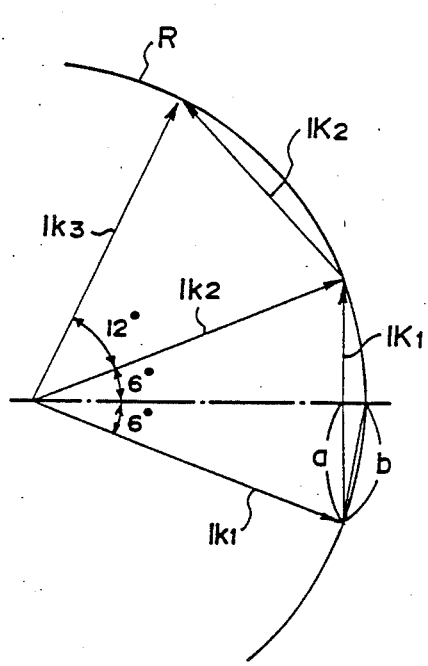

At the time the first surface acoustic wave 15 and the second surface acoustic wave 16 of 2 GHz are generated by the first tilted-finger chirped IDT 17 and the second tilted-finger chirped IDT 18, the condition of diffraction of the guided optical wave becomes as indicated by ②  in FIG. 2. In this case, the guided optical wave L1 is incident upon the first surface acoustic wave 15 of 2 GHz at an angle of incidence of 6°, and said angle satisfies the Bragg condition. Specifically, as shown in FIG. 3A, there obtains the formula $$lk1 + lK1 = lk2$$

wherein lk1 and lk2 respectively denote the wave vector of the guided optical wave L1 and the wave vector of the guided optical wave L2 after being diffracted, and  K1 denotes the wave vector of the first surface acoustic wave 15. Thus the direction of advance of the guided optical wave L2 after being diffracted becomes equal to the direction of the vector  k2 (deflection angle $\alpha = 2\theta = 12°$). Also, at this time, the second surface acoustic wave 16 of 2 GHz is excited by the transducer finger on the upper edge side of the second tilted-finger chirped IDT 18 in FIG. 2 (said transducer finger makes an angle of 12° with respect to the transducer finger on the upper edge side of the first tilted-finger chirped IDT 17), and advances normal to said transducer finger. Therefore, the angle of incidence of the guided optical wave L2 with respect to the second surface acoustic wave 16 is 6°, the second surface acoustic wave 16 has the same wavelength as the wavelength of the first surface acoustic wave 15, and thus the Bragg condition is satisfied. Specifically, as shown in FIG. 3A, there obtains the formula $$lk2 + lK2 = lk3$$

wherein  k3 denotes the wave vector of the guided optical wave L3 after being diffracted by the second surface acoustic wave 16, and lK2 denotes the wave vector of the second surface acoustic wave 16.

Figure 3B:
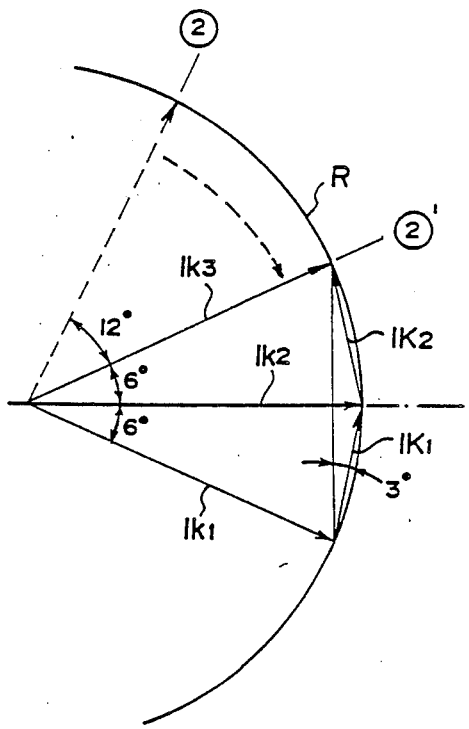

From the aforesaid condition, the frequency of the first surface acoustic wave 15 and the frequency of the second surface acoustic wave 16 are decreased gradually to 1 GHz. The magnitude $|lK1|$ and the magnitude $|lK2|$ of the wave vectors of the first surface acoustic wave 15 and the second surface acoustic wave 16 are equal to $2\pi/\Lambda$ wherein $\Lambda$ denotes the wavelengths of the first surface acoustic wave 15 and the second surface acoustic wave 16, and consequently are proportional to the frequency of the first surface acoustic wave 15 and the frequency of the second surface acoustic wave 16. Therefore, at the time the frequency of the first surface acoustic wave 15 and the frequency of the second surface acoustic wave 16 are 1 GHz, the magnitude of the wave vector lK1 of the first surface acoustic wave 15 and the magnitude of the wave vector lK2 of the second surface acoustic wave 16 become one-half of the values at the time the frequencies are 2 GHz. Also, in this case, since the transducer finger of the first tilted-finger chirped IDT 17 for exciting the first surface acoustic wave 15 of 1 GHz is tilted by 3° with respect to the transducer finger thereof for exciting the first surface acoustic wave 15 of 2 GHz and the transducer finger of the second tilted-finger chirped IDT 18 for exciting the second surface acoustic wave 16 of 1 GHz is tilted by 9° with respect to the transducer finger thereof for exciting the second surface acoustic wave 16 of 2 GHz, the directions of advance of the first surface acoustic wave 15 and the second surface acoustic wave 16, i.e. the directions of the wave vectors lK1 and lK2, change by 3° and 9° respectively from the directions of the wave vectors lK1 and lK2 of the first surface acoustic wave 15 and the second surface acoustic wave 16 of 2 GHz. Also, a≃b in FIG. 3A, and consequently the wave vectors lK1 and lK2 in the case where the frequencies of the first surface acoustic wave 15 and the second surface acoustic wave 16 are 1 GHz become as shown in FIG. 3B.

As mentioned above, the aforesaid formulas lk1+lK1=lk2, and lk2+lK2=lk3 also obtain in the case where the frequencies of the first surface acoustic wave 15 and the second surface acoustic wave 16 are 1 GHz.

Also, the magnitude |lk1| of the wave vector lk1 is equal to $n \cdot 2\pi/\lambda$ wherein $\lambda$ denotes the wavelength of the guided optical wave L1 and n denotes the refractive index. Said wavelength is the same also for the guided optical waves L2 and L3, and therefore the formula

|lk1|=|lk2|=|lk3| always holds. On the other hand, wave vector lk1 of the first surface acoustic wave 15 is expressed as $2\pi/\Lambda$ wherein $\Lambda$ denotes the wavelength of the first surface acoustic wave 15, and said wavelength is always equal to the wavelength of the second surface acoustic wave 16. Therefore, the formula

|lK1|=|lK2| holds. Also, as mentioned above, the directions of the wave vectors lK1 and lK2 change in constant change ratios intrinsic to the first surface acoustic wave 15 and the second surface acoustic wave 16 at the time the frequencies of the first surface acoustic wave 15 and the second surface acoustic wave 16 are changed from 2 GHz to 1 GHz. Therefore the aforesaid relationships lk1+lK1=lk2, and lk2+lK2=lk3 always hold and the Bragg condition between the guided optical wave L1 and the first surface acoustic wave 15 and the Bragg condition between the guided optical wave L2 and the second surface acoustic wave 16 are always satisfied as long as the frequencies of the first surface acoustic wave 15 and the second surface acoustic wave 16 are being changed from 2 GHz to 1 GHz as mentioned above.

As is clear from the above, the direction of advance of the guided optical wave L3 after being diffracted twice coincides with the direction of the vector k3 as shown in FIG. 3A, i.e. the direction indicated by ②  in FIG. 2, at the time the frequencies of the first surface acoustic wave 15 and the second surface acoustic wave 16 are 2 GHz, and coincides with the direction of the vector k3 as shown in FIG. 3B, i.e. the direction indicated by ②  in FIG. 2, at the time the frequencies of the first surface acoustic wave 15 and the second surface acoustic wave 16 are 1 GHz. The difference between the direction of the vector k3 as shown in FIG. 3A and the direction of the vector k3 as shown in FIG. 3B is $2\Delta(2\theta)=24°-12°=12°$. That is, with this embodiment, a wide deflection angle range of 12° is obtained. On the other hand, in the case where optical wave deflection is carried out by use of a single surface acoustic wave the frequency of which changes from 1 GHz to 2 GHz (the frequency band is of one octave so that the adverse effects of the second order diffracted optical wave component can be avoided), a deflection angle range of only 6° is obtained.

When the frequencies of the first surface acoustic wave 15 and the second surface acoustic wave 16 are further decreased below 1 GHz, the guided optical wave L3 is deflected further from the position as indicated by ②  in FIG. 3B. However, at this position, the guided optical wave L2 diffracted once is slightly radiated at the time of 2 GHz frequency. Therefore, the range of ②  to ②' as shown in FIG. 3B should preferably be utilized as the optical wave deflection range as in the aforesaid embodiment.

The deflection angle range $\Delta\delta$ of the light beam L4 radiated out of the optical waveguide 12 is further larger than the deflection angle range $2\Delta(2\theta)$ of said guided optical wave within the optical waveguide. This is because the refractive index of the optical waveguide 12 is larger than that of air.

The other optical deflector 10' shown in FIG. 1 basically has the same configuration as the optical deflector 10, and the elements such as the IDTs of the optical deflector 10' are disposed symmetrically with those of the optical deflector 10. Therefore, in FIG. 1, similar elements of the optical deflector 10' are numbered with the same reference numerals having apostrophe with respect to the optical deflector 10. The frequencies of the alternating voltage applied to the first tilted-finger chirped IDT 17' and the second tilted-finger chirped IDT 18' of the optical deflector 10' are adjusted in the same manner as for the optical deflector 10. Therefore, the optical wave L4' radiated out of the optical waveguide 12' of the optical deflector 10' is deflected over a wide deflection angle range of $\Delta\delta'=\Delta\delta$ in the optical waveguide 12'.

Figure 5:
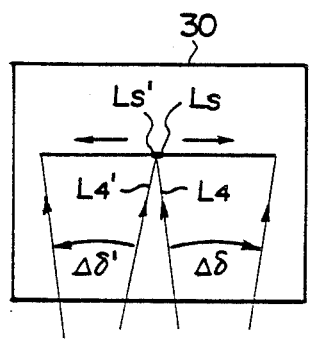
FIGS. 5, 6 and 7 are explanatory views showing the examples of the directions of deflection of a plurality of the optical waves in the first optical deflecting apparatus in accordance with the present invention.

The optical deflectors 10 and 10' are disposed so that, as shown in FIG. 5, the optical waves L4 and L4' radiated out of the optical waveguides 12 and 12' scan in a line with respect to each other on a scanning surface 30, and scanning start extremities Ls and Ls' of the radiated optical waves L4 and L4' adjoin each other. Therefore, on the scanning surface 30, a single main scanning line is formed by the radiated optical waves L4 and L4'. As mentioned above, the deflection angle ranges Δδ and Δδ' of the optical waves L4 and L4' radiated out of the optical deflectors 10 and 10' are equal to each other. Accordingly, with this embodiment, a scanning width can be increased to two times as compared with the case where an optical wave is scanned by use of the optical deflector 10 or the optical deflector 10' alone. Specifically, such an optical deflecting apparatus as having a deflection angle range two times the deflection angle range of the optical deflector 10 or the optical deflector 10' alone is obtained.

Figure 6:
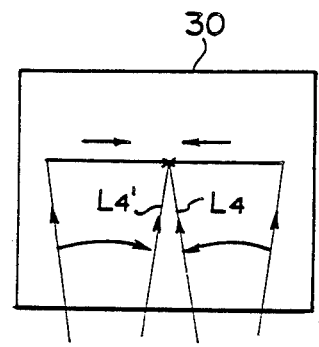
Figure 7:
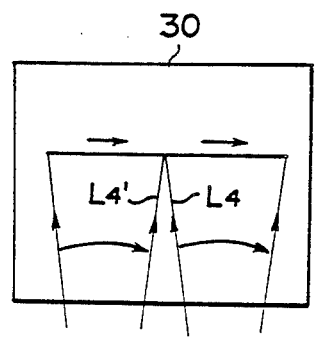

As shown in FIG. 5, the aforesaid embodiment is constituted so that the scanning start extremities Ls and Ls' of the radiated optical waves L4 and L4' adjoin each other on the scanning surface 30. However, in accordance with the layout of the IDTs of the optical deflectors 10 and 10' and the condition of sweeping of the alternating voltage applied to the IDTs, the scanning end extremities of the radiated optical waves L4 and L4' may adjoin each other as shown in FIG. 6, or the scanning start extremity of one of the radiated optical waves L4 and L4' may adjoin the scanning end extremity of the other of the radiated optical waves L4 and L4' as shown in FIG. 7.

Also, the timing of deflection of the optical waves L4 and L4' may be adjusted so that one of the scanning extremities adjoining each other is present temporally before or after the other thereof on the scanning surface 30, or is present at the same time as the other thereof. For example, in FIG. 7, the timing of deflection of the optical waves L4 and L4' may be adjusted so that the scanning start extremity of the optical wave L4 is present sequentially with respect to the scanning end extremity of the optical wave L4' on the scanning surface 30. In this case, scanning is effected as if the scanning surface 30 were scanning by a single optical wave. Alternatively, the deflection timing may be adjusted so that, for example, the scanning start timing of the optical wave L4 and the scanning start timing of the optical wave L4' coincide with each other.

Modifications of the configuration of the optical deflector 10 or the optical deflector 10' will be described hereinbelow. Though the modifications will be described below by taking the optical deflector 10 as an example, the same modifications are possible also for the optical deflector 10'. First, instead of continuously changing the frequencies of the first surface acoustic wave 15 and the second surface acoustic wave 16 from 2 GHz to 1 GHz, they may be changed conversely from 1 GHz to 2 GHz. In this case, only the direction of deflection of the optical wave L4 is reversed. Also, in the case where said frequencies are changed in a mode of 2 GHz→1 GHz→2 GHz→1 GHz, the optical wave L4 is deflected both ways and reciprocal optical wave scanning can be achieved.

In the aforesaid embodiment, the angle of incidence of the guided optical wave L1 with respect to the first surface acoustic wave 15 having a frequency of 2 GHz, i.e. the angle between the direction of advance of the guided optical wave L1 and the transducer finger of the first tilted-finger chirped IDT 17 that excites 2 GHz, is adjusted to 6°, and the angle between the direction of advance of the guided optical wave L1 and the transducer finger of the first tilted-finger chirped IDT 17 that excites 1 GHz is adjusted to 3°. On the other hand, the angle between the direction of advance of the guided optical wave L1 and the transducer finger of the second tilted-finger chirped IDT 18 that excites 2 GHz is adjusted to 18°, and the angle between the direction of advance of the guided optical wave L1 and the transducer finger of the second tilted-finger chirped IDT 18 that excites 1 GHz is adjusted to 9°. In general, in the case where the minimum frequency and the maximum frequency of the first surface acoustic wave 15 and the second surface acoustic wave 16 are respectively f1 and f2 (f2=2f1), the aforesaid Bragg condition can always be satisfied when the angles adjusted to 6°, 3°, 18° and 9° in the aforesaid embodiment are respectively adjusted to $\theta$, $\theta/2$, $3\theta$ and $3\theta/2$. This will be apparent from FIGS. 3A and 3B.

Also, in the case where the shapes of the first tilted-finger chirped IDT 17 and the second tilted-finger chirped IDT 18 are adjusted to the shapes defined by the aforesaid angle $\theta$, the minimum frequency f1 and the maximum frequency f2 of the first surface acoustic wave 15 and the second surface acoustic wave 16 need not necessarily be adjusted so that f2=2f1, and the maximum frequency f2 may be adjusted to a value slightly smaller than 2f1, for example. However, in the case where the first tilted-finger chirped IDT 17 and the second tilted-finger chirped IDT 18 are formed in the shapes mentioned above, the advantages of their shapes should be utilized to the maximum extent, and the frequencies of the first surface acoustic wave 15 and the second surface acoustic wave 16 should preferably be changed within the range of f1 to f2=2f1, which range is free of entry of the second order diffracted optical wave component generated at the time of the minimum frequency of f1 and provides the maximum deflection angle range.

Also, in the first optical deflecting apparatus in accordance with the present invention, the minimum frequency f1 and the maximum frequency f2 of the first surface acoustic wave 15 and the second surface acoustic wave 16 need not necessarily be adjusted so that f2=2f1, and the frequencies of the first surface acoustic wave 15 and the second surface acoustic wave 16 need not necessarily be changed so that they are always equal to each other. Also, when the frequencies and the directions of advance of the first surface acoustic wave 15 and the second surface acoustic wave 16 are changed independently of each other, the aforesaid relationships $$lk1 + lK1 = lk2, \text{ and}$$

$$lk2 + lK2 = lk3$$

can be satisfied through the shapes and arrangement conditions of the first tilted-finger chirped IDT 17 and the second tilted-finger chirped IDT 18.

However, the frequencies of the first surface acoustic wave 15 and the second surface acoustic wave 16 should preferably be changed so that they are always equal to each other. In this case, the two tilted-finger chirped IDTs can be operated by a single common driver, and said operation method is advantageous from the viewpoint of cost since the driver is usually expensive.

Figure 4:
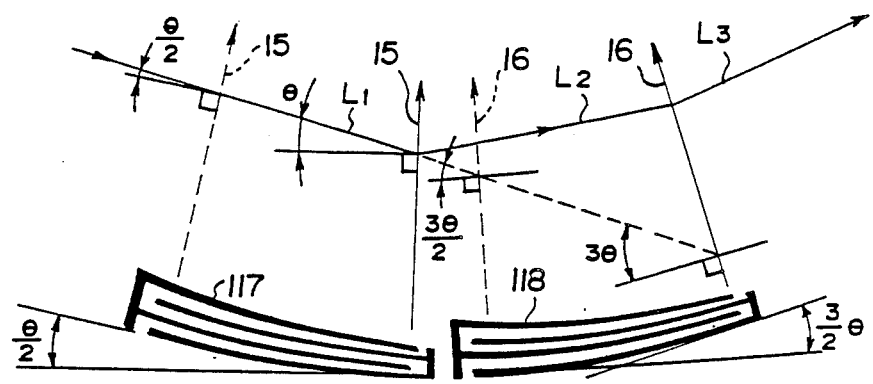
FIG. 4 is a plan view showing different examples of the first and second surface acoustic wave generating means used in the first optical deflecting apparatus in accordance with the present invention.

In first optical deflecting apparatus of the present invention, instead of using the tilted-finger chirped IDTs 17 and 18 as mentioned above, curved-finger chirped IDTs wherein the intervals among the transducer fingers are changed stepwise and the respective transducer fingers are in a circular arc shape may be used to change the frequencies and the directions of advance of the first and second surface acoustic waves. FIG. 4 shows an example of the arrangement of such curved-finger IDTs. In this embodiment, a first curved-finger IDT 117 and a second curved-finger IDT 118 are constituted so that the transducer finger portions at the right end in FIG. 4 generate the first surface acoustic wave 15 and the second surface acoustic wave 16 having the maximum frequency f2, and the transducer finger portions at the left end generate the first surface acoustic wave 15 and the second surface acoustic wave 16 having the minimum frequency f1 as indicated by the broken lines. Also in this case, in order to ensure that f2=2f1, the first curved-finger IDT 117 and the second curved-finger IDT 118 should be constituted and disposed so that the transducer finger portion at the left end of the first curved-finger IDT 117 makes an angle of $\theta/2$ with respect to the direction of advance of the guided optical wave L1, wherein $\theta$ denotes the angle of incidence of the guided optical wave L1 with respect to the first surface acoustic wave 15 having the maximum frequency f2, and the transducer finger portions at the right end and the left end respectively of the second curved-finger IDT 118 make an angle of $3\theta$ and an angle of $3\theta/2$ with respect to the direction of advance of the guided optical wave L1.

In the case where, instead of the optical waveguide 12 comprising the LiNbO$_3$ wafer and the Ti diffusion film overlaid on the wafer, an optical waveguide formed of ZnO is used as the optical waveguide 12, a deflection angle range of approximately $2\Delta(2\theta)=8°$ can be obtained when the maximum frequency and the minimum frequency of the first surface acoustic wave 15 and the second surface acoustic wave 16 are adjusted respectively to 1.0 GHz and 0.5 GHz, for example.

Also, instead of the aforesaid FGC 13 and the FGC 14, a coupler prism or the like may be used for the entry of the optical wave into the optical waveguide 12 and the radiation thereof out of the optical waveguide 12, or the optical wave may be directly entered into and radiated out of the edge faces of the optical waveguide 12. In order to convert the divergent optical wave L into the collimated optical wave and to converge the optical wave L4 radiated out of the optical waveguide 12, it is possible to use an optical waveguide lens and an ordinary external lens.

Furthermore, three or more surface acoustic waves may be propagated through the optical waveguide 12 or the optical waveguide 12', and the guided optical wave may be diffracted and deflected three times or more by the surface acoustic waves. Also, with the optical deflecting apparatus having such a configuration, the same effects as mentioned above can be obtained by the two adjacent surface acoustic waves, and therefore the optical deflecting apparatus of this type is also embraced in the scope of the optical deflecting apparatus in accordance with the present invention. Moreover, a larger scanning width can be obtained by providing three or more optical waveguides and combining the three or more guided and deflected optical waves.

Figure 8:
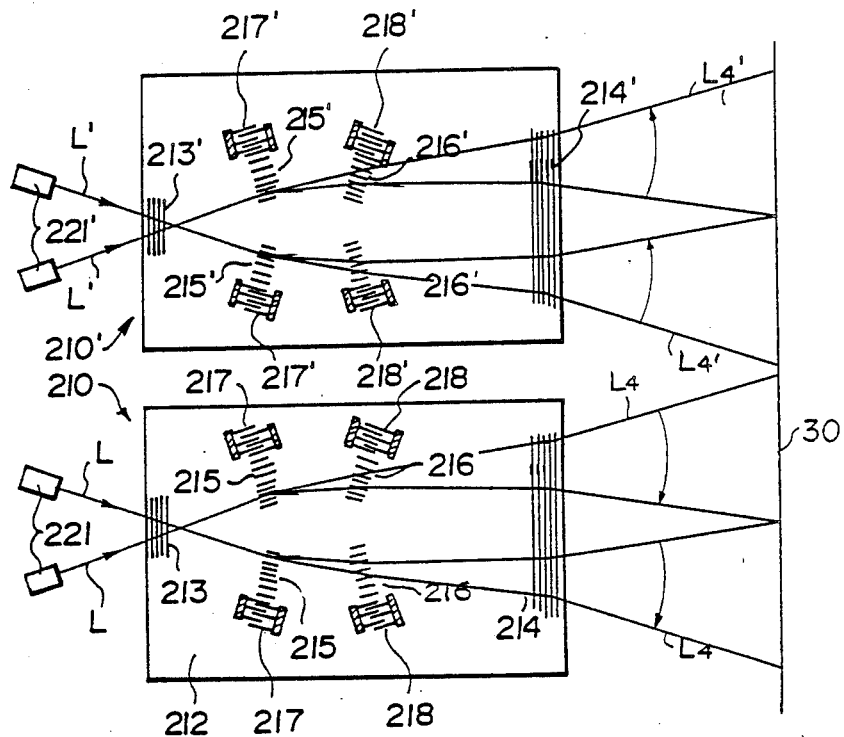
FIG. 8 is a schematic plan view showing another embodiment of the first optical deflecting apparatus in accordance with the present invention.

Also, as shown in FIG. 8, an optical deflector 10 may be constituted so that two optical waves L, L are made to impinge upon a single optical waveguide 212 and diffracted twice by an IDT 217 and an IDT 218 (or thrice or more), and two optical waves L4, L4 radiated out of the optical waveguide 212 scan in a line with respect to each other on the scanning surface 30. The optical deflector 210 may be disposed side by side with an optical deflector 210' having the same configuration as the optical deflector 210, so that the radiated optical waves L4, L4 and radiated optical waves L4', L4' scan in a line with respect to one another, and the scanning extremities thereof adjoin one another. In this manner, a larger scanning width can be obtained. In FIG. 8, reference numerals 213 and 213' denote linear grating couplers (hereinafter abbreviated as LGC) for entry of the optical waves, and reference numerals 214 and 214' denote LGCs for radiation of the optical waves. Reference numerals 215 and 215' denote the first surface acoustic waves, and reference numerals 216 and 216' denote the second surface acoustic waves. Reference numerals 217' and 218' denote IDTs of the same type as the IDT 217 and the IDT 218, and reference numerals 221 and 221' denote the light sources.

An embodiment of the second optical deflecting apparatus in accordance with the present invention will be described hereinbelow with reference to FIG. 9. An optical deflecting apparatus 310 comprises an optical waveguide 312 formed on a substrate 311, an LGC 313 for entry of the optical waves which is formed on the optical waveguide 312, and an LGC 314 for radiation of the optical waves. The optical deflecting apparatus 310 also comprises a first tilted-finger chirped IDT 317 and a second tilted-finger chirped IDT 318 for generating a first surface acoustic wave 315 and a second surface acoustic wave 316 respectively, which advance in directions intersecting the optical paths of a first guided optical wave L1 and a second guided optical wave L1' advancing between the LGC 313 and the LGC 314, high-frequency amplifiers 319 and 319' for applying the high-frequency alternating voltage to the first tilted-finger chirped IDT 317 and the second tilted-finger chirped IDT 318, and sweepers 320 and 320' for continuously changing (sweeping) the frequencies of the alternating voltage.

In this embodiment, by way of example, the substrate 311 is formed of a LiNbO$_3$ wafer, and the optical waveguide 312 is formed by overlaying a Ti diffusion film on the surface of the wafer in the same manner as the optical waveguide 12 shown in FIG. 1. Also, the first tilted-finger chirped IDT 317 and the second tilted-finger chirped IDT 318 may be formed by the same method as for the first tilted-finger chirped IDT 17 and the second tilted-finger chirped IDT 18 shown in FIG. 1.

The first optical wave L and the second optical wave L' which are to be deflected are emitted by light sources 321 and 321' constituted by semiconductor lasers or the like toward the LGC 313. The first optical wave L and the second optical wave L' (collimated waves) are taken into the optical waveguide 312 by the LGC 313, and are guided inside of the optical waveguide 312. In the case where the optical waves L and L' are divergent waves, instead of the LGC 313, an FGC may be employed, and the divergent waves may be collimated by the FGC and taken into the optical waveguide 312. The first guided optical wave L1 which is guided inside of the optical waveguide 312 is diffracted (Bragg diffraction) as shown by the acousto-optic interaction with the first surface acoustic wave 315 generated by the first tilted-finger chirped IDT 317. Also, the frequency of the alternating voltage applied to the first tilted-finger chirped IDT 317 is continuously changed as mentioned above, and therefore the frequency of the first surface acoustic wave 315 is changed continuously. As is clear from the Formula (1) shown above, the deflection angle of the guided optical wave L2 after being diffracted by the first surface acoustic wave 315 is approximately proportional to the frequency of the first surface acoustic wave 315. Therefore, as the frequency of the first surface acoustic wave 315 is changed as mentioned above, the guided optical wave L2 is deflected continuously as indicated by the arrow A. The guided optical wave L2 is radiated by the LGC 314 out of the optical waveguide 312, and the guided optical wave L4 thus radiated out of the optical waveguide 312 one-dimensionally scans the scanning surface 30.

The second guided optical wave L1' which is guided inside of the optical waveguide 312 is diffracted (Bragg diffraction) as shown by the acousto-optic interaction with the second surface acoustic wave 316 generated by the second tilted-finger chirped IDT 318. Also, the frequency of the alternating voltage applied to the second tilted-finger chirped IDT 318 is swept in the same manner as the case of the first tilted-finger chirped IDT 317, and therefore the guided and diffracted optical wave L2' is deflected continuously as indicated by the arrow B. The guided and deflected optical wave L2' is radiated by the LGC 314 out of the optical waveguide 312, and the optical wave L4' thus radiated out of the optical waveguide 312 one-dimensionally scans the scanning surface 30.

As the requirements of the second optical deflecting apparatus in accordance with the present invention, the first tilted-finger chirped IDT 317 and the second tilted-finger chirped IDT 318 are disposed so that, as shown in FIG. 5, the optical waves L4 and L4' radiated out of the optical waveguide 312 scan in a line with respect to each other on a scanning surface 30, and scanning start extremities Ls and Ls' of the radiated optical waves L4 and L4' adjoin each other. Therefore, on the scanning surface 30, a single main scanning line is formed by the radiated optical waves L4 and L4'. For example, in the case where the deflection angle ranges of the guided and deflected optical waves L2 and L2' are equal to each other, it is possible to obtain a scanning width two times the scanning width possible with the case where optical deflection is carried out by use of the first surface acoustic wave 315 or the second surface acoustic wave 316 alone. Specifically, such an optical deflecting apparatus as having a deflection angle range two times the deflection angle range of an optical deflecting apparatus provided with the first tilted-finger chirped IDT 317 or the second tilted-finger chirped IDT 318 alone is obtained.

Figure 9:
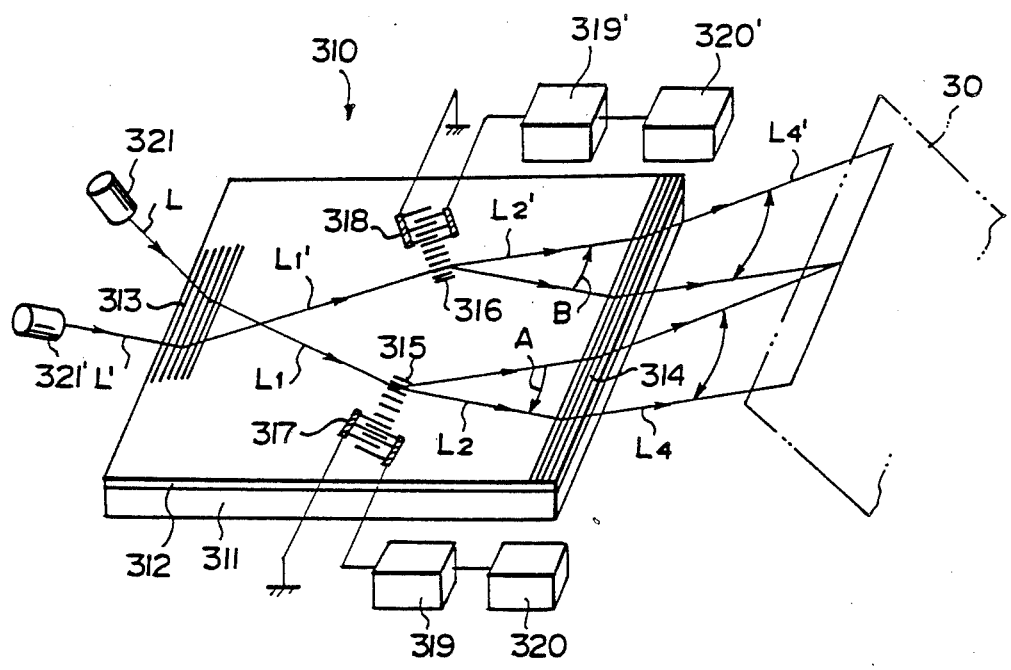
FIG. 9 is a schematic perspective view showing an embodiment of the second optical deflecting apparatus in accordance with the present invention.

The embodiment shown in FIG. 9 is constituted so that the scanning start extremities Ls and Ls' of the radiated optical waves L4 and L4' adjoin each other on the scanning surface 30. However, in accordance with the layout of the IDT 317 and the IDT 318 and the condition of sweeping of the alternating voltage applied to the IDT 317 and the IDT 318, the scanning end extremities of the radiated optical waves L4 and L4' may adjoin each other as shown in FIG. 6, or the scanning start extremity of one of the radiated optical waves L4 and L4' may adjoin the scanning end extremity of the other of the radiated optical waves L4 and L4' as shown in FIG. 7.

Also, as mentioned above with reference to FIG. 7, the timing of deflection of the optical waves L4 and L4' may be adjusted so that one of the scanning extremities adjoining each other is present temporally before or after the other thereof on the scanning surface 30, or is present at the same time as the other thereof.

Figure 10:
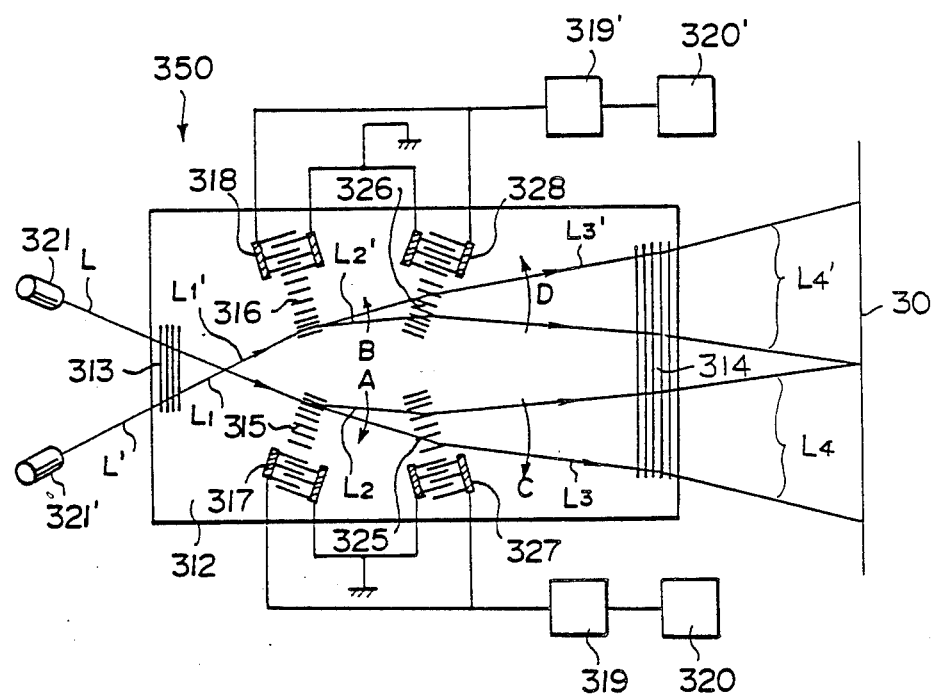
FIG. 10 is a schematic plan view showing an embodiment of the third optical deflecting apparatus in accordance with the present invention.

An embodiment of the third optical deflecting apparatus in accordance with the present invention will be described hereinbelow with reference to FIG. 10. In FIG. 10, similar elements are numbered with the same reference numerals with respect to FIG. 9. In an optical deflecting apparatus 350, a third tilted-finger chirped IDT 327 is provided adjacent the first tilted-finger chirped IDT 317, and a fourth tilted-finger chirped IDT 328 is provided adjacent the second tilted-finger chirped IDT 318.

The guided optical wave L2 after being diffracted and deflected by the first surface acoustic wave 315 in the manner as mentioned above is then diffracted in a direction that amplifies the aforesaid deflection by the acousto-optic interaction with a third surface acoustic wave 325 generated by the third tilted-finger chirped IDT 327. The frequency of the alternating voltage applied to the third tilted-finger chirped IDT 327 is swept in the same manner as the case of the first tilted-finger chirped IDT 317, and therefore the frequency of the third surface acoustic wave 325 is changed continuously in the same manner as the case of the first surface acoustic wave 315. Accordingly, the guided optical wave L3 after the passage through the third surface acoustic wave 325 is deflected continuously as indicated by the arrow C.

On the other hand, the guided optical wave L2' after being diffracted and deflected by the second surface acoustic wave 316 in the manner as mentioned above is then diffracted in a direction that amplifies the aforesaid deflection by the acousto-optic interaction with a fourth surface acoustic wave 326 generated by the fourth tilted-finger chirped IDT 328. The frequency of the alternating voltage applied to the fourth tilted-finger chirped IDT 328 is swept in the same manner as the case of the second tilted-finger chirped IDT 318, and therefore the frequency of the fourth surface acoustic wave 326 is changed continuously in the same manner as the case of the second surface acoustic wave 316. Accordingly, the guided optical wave L3' after the passage through the fourth surface acoustic wave 326 is deflected continuously as indicated by the arrow D. The guided optical waves L3 and L3' thus deflected are radiated by the LGC 314 out of the optical waveguide 312, and the optical waves L4 and L4' thus radiated out of the optical waveguide 312 one-dimensionally scan the scanning surface 30.

In the embodiment shown in FIG. 10, the first tilted-finger chirped IDT 317, the second tilted-finger chirped IDT 318, the third tilted-finger chirped IDT 327, and the fourth tilted-finger chirped IDT 328 are disposed so that the optical waves L4 and L4' radiated out of the optical waveguide 312 scan in a line with respect to each other on a scanning surface 30, and scanning start extremities Ls and Ls' of the radiated optical waves L4 and L4' adjoin each other. Therefore, on the scanning surface 30, a single main scanning line is formed by the radiated optical waves L4 and L4';

The deflection angle ranges $2\Delta(2\theta)$, $2\Delta(2\theta)'$ of the guided optical waves L3 and L3', will be described hereinbelow with reference to FIG. 2. In the embodiment shown in FIG. 10, the second tilted-finger chirped IDT 318 and the fourth tilted-finger chirped IDT 328 have the same configurations as the first tilted-finger chirped IDT 317 and the third tilted-finger chirped IDT 327 respectively, and are disposed symmetrically therewith. Also, the application of the voltage to the IDTs 318 and 328 is carried out in the same manner as the voltage application to the IDTs 317 and 327. Therefore, the deflection angle ranges will be described below only for the deflection angle range 2Δ(2θ) of the radiated optical wave L3. FIG. 2 shows the detailed shapes and the arrangement conditions of the first tilted-finger chirped IDT 317 and the third tilted-finger chirped IDT 327. With reference to FIG. 2, the first tilted-finger chirped IDT 317 and the third tilted-finger chirped IDT 327 are each formed so that intervals among the transducer fingers are changed stepwise in a constant change ratio and the directions of the transducer fingers are changed stepwise in a constant change ratio. Both the first tilted-finger chirped IDT 317 and the third tilted-finger chirped IDT 327 are disposed so that the side with the smallest transducer finger interval, i.e. the upper edge side in FIG. 2, faces the guided optical wave side. As the frequency of the applied voltage is swept as mentioned above, the upper edge sides of the first tilted-finger chirped IDT 317 and the third tilted-finger chirped IDT 327 respectively generate the first surface acoustic wave 315 and the third surface acoustic wave 325 of the maximum frequency f2=2 GHz, and the lower edge sides thereof respectively generate the first surface acoustic wave 315 and the third surface acoustic wave 325 of the minimum frequency f1=1 GHz. The first tilted-finger chirped IDT 317 has such a shape that the transducer finger on the upper edge side and the transducer finger on the lower edge side are tilted by 3° with respect to each other, and is disposed so that the transducer finger on the upper edge side makes an angle of 6° with respect to the direction of advance of the guided optical wave L1, and the transducer finger on the lower edge side makes an angle of 3° with respect to the direction of advance of the guided optical wave L1. On the other hand, the third tilted-finger chirped IDT 327 has such a shape that the transducer finger on the upper edge side and the transducer finger on the lower edge side are tilted by 9° with respect to each other, and is disposed so that the transducer finger on the upper edge side makes an angle of 18° with respect to the direction of advance of the guided optical wave L1, and the transducer finger on the lower edge side makes an angle of 9° with respect to the direction of advance of the guided optical wave L1. Grounding electrodes of the first tilted-finger chirped IDT 317 and the third tilted-finger chirped IDT 327 may be formed integrally with each other. Also, the tilted-finger chirped IDTs as mentioned above are described in detail in, for example, the aforesaid literature of C. S. TSAI.

At the time the first surface acoustic wave 315 and the third surface acoustic wave 325 of 2 GHz are generated by the first tilted-finger chirped IDT 317 and the third tilted-finger chirped IDT 327, the condition of diffraction of the guided optical wave becomes as indicated by ② in FIG. 2. In this case, the guided optical wave L1 is incident upon the first surface acoustic wave 315 of 2 GHz at an angle of incidence of 6°, and said angle satisfies the Bragg condition. Specifically, as shown in FIG. 3A, there obtains the formula $$lk1 + lK1 = lk2$$

wherein lk1 and lk2 respectively denote the wave vector of the guided optical wave L1 and the wave vector of the guided optical wave L2 after being diffracted, and lK1 denotes the wave vector of the first surface acoustic wave 315. Thus the direction of advance of the guided optical wave L2 after being diffracted becomes equal to the direction of the vector lk2 (deflection angle $\alpha = 2\theta = 12°$). Also, at this time, the third surface acoustic wave 325 of 2 GHz is excited by the transducer finger on the upper edge side of the third tilted-finger chirped IDT 327 in FIG. 2 (said transducer finger makes an angle of 12° with respect to the transducer finger on the upper edge side of the first tilted-finger chirped IDT 317), and advances normal to said transducer finger. Therefore, the angle of incidence of the guided optical wave L2 with respect to the third surface acoustic wave 325 is 6°, the third surface acoustic wave 325 has the same wavelength as the wavelength of the first surface acoustic wave 315, and thus the Bragg condition is satisfied. Specifically, as shown in FIG. 3A, there obtains the formula $$lk2 + lK2 = lk3$$

wherein lk3 denotes the wave vector of the guided optical wave L3 after being diffracted by the third surface acoustic wave 325, and lK2 denotes the wave vector of the third surface acoustic wave 325.

From the aforesaid condition, the frequency of the first surface acoustic wave 315 and the frequency of the third surface acoustic wave 325 are decreased gradually to 1 GHz. The magnitude $|lK1|$ and the magnitude $|lK2|$ of the wave vectors of the first surface acoustic wave 315 and the third surface acoustic wave 325 are equal to $2\pi/\Lambda$ wherein $\Lambda$ denotes the wavelengths of the first surface acoustic wave 315 and the third surface acoustic wave 325, and consequently are proportional to the frequency of the first surface acoustic wave 315 and the frequency of the third surface acoustic wave 325. Therefore, at the time the frequency of the first surface acoustic wave 315 and the frequency of the third surface acoustic wave 325 are 1 GHz, the magnitude of the wave vector lK1 of the first surface acoustic wave 315 and the magnitude of the wave vector lK2 of the third surface acoustic wave 325 become one-half of the values at the time the frequencies are 2GHz. Also, in this case, since the transducer finger of the first tilted-finger chirped IDT 317 for exciting the first surface acoustic wave 315 of 1 GHz is tilted by 3° with respect to the transducer finger thereof for exciting the first surface acoustic wave 315 of 2 GHz and the transducer finger of the third tilted-finger chirped IDT 327 for exciting the third surface acoustic wave 325 of 1 GHz is tilted by 9° with respect to the transducer finger thereof for exciting the third surface acoustic wave 325 of 2 GHz, the directions of advance of the first surface acoustic wave 315 and the third surface acoustic wave 325, i.e. the directions of the wave vectors lK1 and lK2, change by 3° and 9° respectively from the directions of the wave vectors lK1 and lK2 of the first surface acoustic wave 315 and the third surface acoustic wave 325 of 2 GHz. Also, a=b in FIG. 3A, and consequently the wave vectors lK1 and lK2 in the case where the frequencies of the first surface acoustic wave 315 and the third surface acoustic wave 325 are 1 GHz become as shown in FIG. 3B.

As mentioned above, the aforesaid formulas $$lk1 + lK1 = lk2, \text{ and}$$

$$lk2 + lK2 = lk3$$

also obtain in the case where the frequencies of the first surface acoustic wave 315 and the third surface acoustic wave 325 are 1 GHz.

Also, the magnitude $|lk1|$ of the wave vector $lk1$ is equal to $n \cdot 2\pi/\lambda$ wherein $\lambda$ denotes the wavelength of the guided optical wave L1 and n denotes the refractive index. Said wavelength is the same also for the guided optical waves L2 and L3, and therefore the formula $$|lk1| = |lk2| = |lk3|$$

always holds. On the other hand, the wave vector $lK1$ of the first surface acoustic wave 315 is expressed as $2\pi/\Lambda$ wherein $\Lambda$ denotes the wavelength of the first surface acoustic wave 315, and said wavelength is always equal to the wavelength of the third surface acoustic wave 325. Therefore, the formula $$|lK1| = |lK2|$$

holds. Also, as mentioned above, the directions of the wave vectors lk1 and lk2 change in constant change ratios intrinsic to the first surface acoustic wave 315 and the third surface acoustic wave 325 at the time the frequencies of the first surface acoustic wave 315 and the third surface acoustic wave 325 are changed from 2 GHz to 1 GHz. Therefore, the aforesaid relationships $$lk1 + lK1 = lk2, \text{ and}$$

$$lk2 + lK2 = lk3$$

always hold and the Bragg condition between the guided optical wave L1 and the first surface acoustic wave 315 and the Bragg condition between the guided optical wave L2 and the third surface acoustic wave 325 are always satisfied as long as the frequencies of the first surface acoustic wave 315 and the third surface acoustic wave 325 are being changed from 2 GHz to 1 GHz as mentioned above.

As is clear from the above, the direction of advance of the guided optical wave L3 after being diffracted twice coincides with the direction of the vector lk3 as shown in FIG. 3A, i.e. the direction indicated by in ②  as in FIG 2, at the time the frequencies of the first surface acoustic wave 315 and the third surface acoustic wave 325 are 2 GHz, and coincides with the direction of the vector lk3 as shown in FIG. 3B, i.e. the direction indicated by ②' in FIG. 2, at the time the frequencies of the first surface acoustic wave 315 and the third surface acoustic wave 325 are 1 GHz. The difference between the direction of the vector lk3 as sown in FIG. 3A and the direction of the vector lk3 as shown in FIG. 3B is $24° - 12° = 12°$. That is, with this embodiment, a wide deflection angle range of $2\Delta(2\theta) = 12°$ is obtained. On the other hand, in the case where optical wave deflection is carried out by use of a single surface acoustic wave the frequency of which changes from 1 GHz to 2 GHz (the frequency band is of one octave so that the adverse effects of the second-order diffracted optical wave component can be avoided), a deflection angle range of only 6°, i.e. one half of the aforesaid value, is obtained.

As mentioned above, in this embodiment, the second tilted-finger chirped IDT 318 and the fourth tilted-finger chirped IDT 328 have the same configurations as the first tilted-finger chirped IDT 317 and the third tilted-finger chirped IDT 327 respectively, and are disposed symmetrically therewith. Also, the application of the voltage to the IDTs 318 and 328 is carried out in the same manner as the voltage application to the IDTs 317 and 327. Therefore, the relationships of $$lk4 + lK3 = lk5, \text{ and}$$

$$lk5 + lK4 = lk6$$

always apply wherein lk4 denotes the wave vector of the second guided optical wave L1' before being diffracted by the second surface acoustic wave 316, lk5 denotes the wave vector of the second guided optical wave L2' after being diffracted by the second surface acoustic wave 316, lk6 denotes the wave vector of the second guided optical wave L3' after being diffracted by the fourth surface acoustic wave 326, and lK3 and lK4 respectively denote wave vectors of the second surface acoustic wave 316 and the fourth surface acoustic wave 326. The deflection angle $2\Delta(2\theta)$ of the second guided optical wave L3, is equal to the deflection angle range $2\delta(2\theta)$ of the second guided optical wave L3, i.e. 12°.

radiated out of the optical waveguide 12 is further larger than the deflection angle range $2\Delta(2\theta)$ of said guided optical wave within the optical waveguide. This is because the refractive index of the optical waveguide 12 is larger than that of air.

The optical wave scanning width on the scanning surface 30 is equal to the sum of scanning width of the optical wave L4 deflected over the deflection angle range $\Delta\delta$ and the scanning width of the optical wave L4' deflected over the deflection angle range $\Delta\delta$. Also, in this embodiment, $\Delta\delta' = \Delta\delta$. Therefore, it is possible to obtain a scanning width about four times the scanning width possible in the case where the optical deflection is carried out by use of a single surface acoustic wave alone.

When the frequencies of the first surface acoustic wave 315 and the third surface acoustic wave 325 are further decreased below 1 GHz, the guided optical wave L3 is deflected further from the position as indicated by ②' in FIG. 3B. However, at this position, the guided optical wave L2 diffracted once is slightly radiated at the time of 2 GHz frequency. Therefore, the range of ② to ②' a shown in FIG. 3B should preferably be utilized as the optical wave deflection range as in the aforesaid embodiment.

Modifications of the configuration of the optical deflecting apparatus 350 will be described hereinbelow. Though the modifications will be described below by taking the first tilted-finger chirped IDT 317 and the third tilted-finger chirped IDT 327 as an example, the same modifications are possible also for the second tilted-finger chirped IDT 318 and the fourth tilted-finger chirped IDT 328. First, instead of continuously changing the frequencies of the first surface acoustic wave 315 and the third surface acoustic wave 325 from 2 GHz to 1 GHz, they may be changed conversely from 1 GHz to 2 GHz. In this case, only the direction of deflection of the optical wave L4 is reversed. Also, in the case where said frequencies are changed in a mode of 2 GHz→1 GHz→2 GHz→1 GHz, the optical wave L4 is deflected both ways and reciprocal optical wave scanning can be achieved.

In the aforesaid embodiment, the angle of incidence of the guided optical wave L1 with respect to the first surface acoustic wave 315 having a frequency of 2 GHz, i.e. the angle between the direction of advance of the guided optical wave L1 and the transducer finger of the first tilted-finger chirped IDT 317 that excites 2 GHz, is adjusted to 6°, and the angle between the direction of advance of the guided optical wave L1 and the transducer finger of the first tilted-finger chirped IDT 317 that excites 1 GHz is adjusted to 3°. On the other hand, the angle between the direction of advance of the guided optical wave L1 and the transducer finger of the third tilted-finger chirped IDT 327 that excites 2 GHz is adjusted to 18°, and the angle between the direction of advance of the guided optical wave L1 and the transducer finger of the third tilted-finger chirped IDT 327 that excites 1 GHz is adjusted to 9°. In general, in the case where the minimum frequency and the maximum frequency of the first surface acoustic wave 315 and the third surface acoustic wave 325 are respectively f1 and f2 (f2=2f1), the aforesaid Bragg condition can always be satisfied when the angles adjusted to 6°, 3°, 18° and 9° in the aforesaid embodiment are respectively adjusted to $\theta$, $\theta/2$, $3\theta$ and $3\theta/2$. This will be apparent from FIGS. 3A and 3B.

Also, in the case where the shapes of the first tilted-finger chirped IDT 317 and the third tilted-finger chirped IDT 327 are adjusted to the shapes defined by the aforesaid angle $\theta$, the minimum frequency f1 and the maximum frequency f2 of the first surface acoustic wave 315 and the third surface acoustic wave 325 need not necessarily be adjusted so that f2=2f1, and the maximum frequency f2 may be adjusted to a value slightly smaller than 2f1, for example. However, in the case where the first tilted-finger chirped IDT 317 and the third tilted-finger chirped IDT 327 are formed in the shapes mentioned above, the advantages of their shapes should be utilized to the maximum extent, and the frequencies of the first surface acoustic wave 315 and the third surface acoustic wave 325 should preferably be changed within the range of f1 to f2=2f1, which range is free of entry of the second-order diffracted optical wave component generated at the time of the minimum frequency of f1 and provides the maximum deflection angle range.

Also, in the third optical deflecting apparatus in accordance with the present invention, the minimum frequency f1 and the maximum frequency f2 of the first surface acoustic wave 315 and the third surface acoustic wave 325 need not necessarily be adjusted so that f2=2f1, and the frequencies of the first surface acoustic wave 315 and the third surface acoustic wave 325 need not necessarily be changed so that they are always equal to each other. Also, when the frequencies and the directions of advance of the first surface acoustic wave 315 and the third surface acoustic wave 325 are changed independently of each other, the aforesaid relationships lk1+lK1=lk2, and lk2+lK2=lk3 can be satisfied through the shapes and arrangement conditions of the first tilted-finger chirped IDT 317 and the third tilted-finger chirped IDT 327.

However, the frequencies of the first surface acoustic wave 315 and the third surface acoustic wave 325 should preferably be changed so that they are always equal to each other. In this case, the two tilted-finger chirped IDTs can be operated by a single common driver, and said operation method is advantageous from the viewpoint of cost since the driver is usually expensive.

Figure 11:
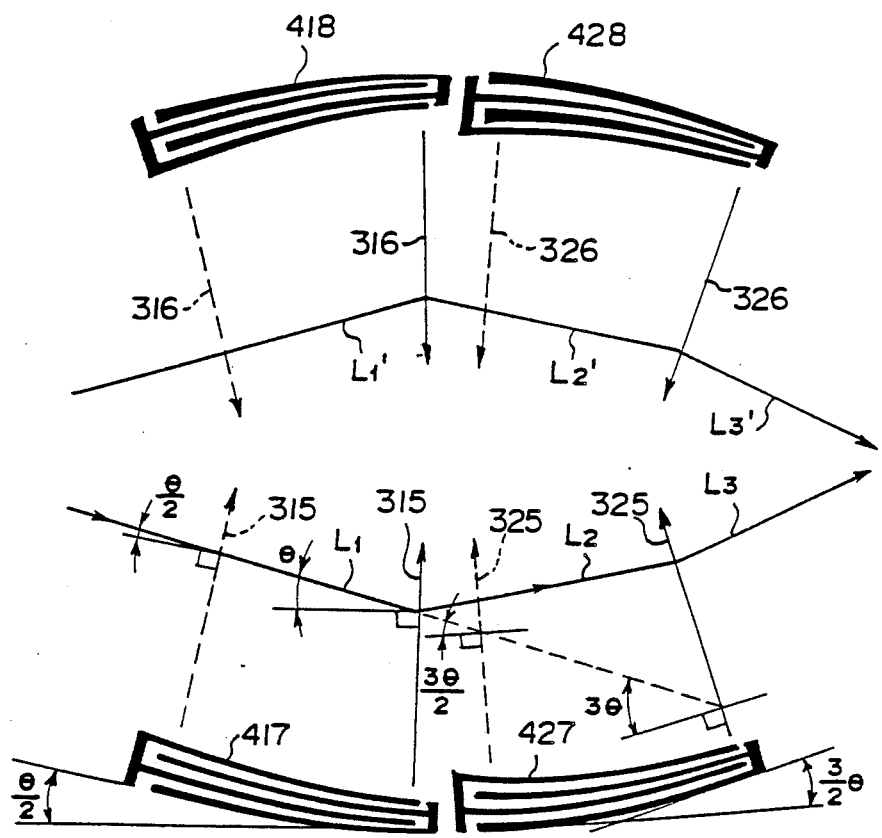
FIG. 11 is a plan view showing different examples of the surface acoustic wave generating means used in the second and third optical deflecting apparatuses in accordance with the present invention.

In second and third optical deflecting apparatus of the present invention, instead of using the tilted-finger chirped IDTs 317, 318, 327 and 328 as mentioned above, curved-finger IDTs wherein the intervals among the transducer fingers are changed stepwise and the respective transducer fingers are in a circular arc shape may be used. FIG. 11 shows an example of the arrangement of such curved-finger IDTs. In this embodiment, a first curved-finger IDT 417 and a third curved-finger IDT 427 are constituted so that the transducer finger portions at the right end in FIG. 11 generate the first surface acoustic wave 315 and the third surface acoustic wave 325 having the maximum frequency f2, and the transducer finger portions at the left end generate the first surface acoustic wave 315 and the third surface acoustic wave 325 having the minimum frequency f1 as indicated by the broken lines. Also in this case, in order to ensure that f2=2f1, the first curved-finger IDT 417 and the third curved-finger IDT 427 should be constituted and disposed so that the transducer finger portion at the left end of the first curved-finger IDT 417 makes an angle of $\theta/2$ with respect to the direction of advance of the guided optical wave L1, wherein $\theta$ denotes the angle of incidence of the guided optical wave L1 with respect to the first surface acoustic wave 315 having the maximum frequency f2, and the transducer finger portions at the right end and the left end respectively of the third curved-finger chirped IDT 427 make an angle of $3\theta$ and an angle of $3\theta/2$ with respect to the direction of advance of the guided optical wave L1. Also, a second curved-finger chirped IDT 418 and a fourth curved-finger chirped IDT 428 may be formed in the same manner as the IDT 417 and the IDT 427.

Also, instead of the aforesaid LGC 313 and the LGC 314, a coupler prism or the like may be used for the entry of the optical wave into the optical waveguide 312 and the radiation thereof out of the optical waveguide 312, or the optical wave may be directly entered into and radiated out of the edge faces of the optical waveguide 312. In order to convert the optical waves L and L' into the collimated optical waves in the case where they are divergent waves, and to converge the optical wave radiated out of the optical waveguide 312, it is possible to use an optical waveguide lens and an ordinary external lens.

In the case where, instead of the optical waveguide 312 comprising the $LiNbO_3$ wafer and the Ti diffusion film overlaid on the wafer, an optical waveguide formed of ZnO is used as the optical waveguide 312, a deflection angle range of approximately $\Delta(2\theta)=8°$ can be obtained when the maximum frequency and the minimum frequency of the first surface acoustic wave 315 and the third surface acoustic wave 325 are adjusted respectively to 1.0 GHz and 0.5 GHz, for example.

The second and third optical deflecting apparatuses in accordance with the present invention may also be constituted so that three or more optical waves are guided inside of the optical waveguide and diffracted and deflected by the surface acoustic waves, the three or more optical waves diffracted and radiated out of the optical waveguide scan in a line with respect to one another on the predetermined surface, and the scanning extremities of the adjacent radiated optical waves adjoin each other. In such an optical deflecting apparatus, the means for diffracting and deflecting the two adjacent optical waves can be constituted in the same manner as mentioned above. Therefore, the optical deflecting apparatus of this type is also embraced in the scope of the optical deflecting apparatus in accordance with the present invention.

Furthermore, the third optical deflecting apparatus in accordance with the present invention may be constituted so that three or more surface acoustic waves are propagated through the optical waveguide for deflecting a single guided optical wave, and the single guided optical wave is diffracted and deflected three times or more by the surface acoustic waves. Also, with the optical deflecting apparatus having such a configuration, the same effects as mentioned above can be obtained by the two adjacent surface acoustic waves, and therefore the optical deflecting apparatus of this type is also embraced in the scope of the third optical deflecting apparatus in accordance with the present invention.

An embodiment of the fourth optical deflecting apparatus in accordance with the present invention will be described hereinbelow with reference to FIG. 12. In FIG. 12, similar elements are numbered with the same reference numerals with respect to FIG. 9.

Figure 13:
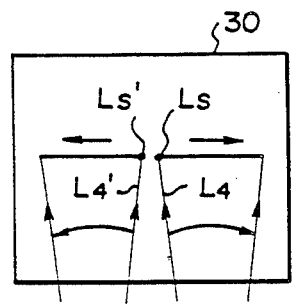
FIGS. 13, 14 and 15 are explanatory views showing the examples of the directions of deflection of two optical waves in the fourth and fifth optical deflecting apparatuses in accordance with the present invention.

In an optical deflecting apparatus 510, the first tilted-finger chirped IDT 317 and the second tilted-finger chirped IDT 318 are disposed so that, as shown in FIG. 13, the optical waves L4 and L4' radiated out of the optical waveguide 312 do not overlap each other on the scanning surface 30. Therefore, main scanning lines are formed independently by the radiated optical waves L4 and L4' on the scanning surface 30. The scanning surface 30 is moved by a known sub-scanning means (not shown) in the subscanning direction as indicated by the arrow Y approximately normal to the direction of main scanning. In this manner, different regions of the scanning surface 30 are two-dimensionally scanned by the radiated optical waves L4 and L4'.

Accordingly, in the case where image recording is carried out by use of the optical deflecting apparatus 510 (in this case, the scanning surface 30 is constituted by a photosensitive material), the optical waves L and L' impinging upon the optical deflecting apparatus 510 are modulated in accordance with different image signals in synchronization with the deflection timing. As a result, the images which the different image signals represent respectively are recorded simultaneously on the scanning surface 30. On the other hand, in the case where image reading is carried out by use of the optical deflecting apparatus 510 (in this case, the scanning surface 30 is constituted by a reading original carrying two images recorded thereon), the optical waves simultaneously emitted by the portions of the scanning surface 30 that are scanned by the radiated optical waves L4 and L4', the optical waves simultaneously reflected by said portions, or the optical waves simultaneously passing through said portions are detected independently by different photoelectric read-out means. In this manner, two sets of image signals that represent the two images are obtained.

With the optical deflecting apparatus 510 wherein the two optical waves for the recording or reading of the respective images are deflected by the first surface acoustic wave 315 and the second surface acoustic wave 316 respectively, the same deflection angle range as when a single image is recorded or read by use of a single optical wave is ensured for each image.

Figure 14:
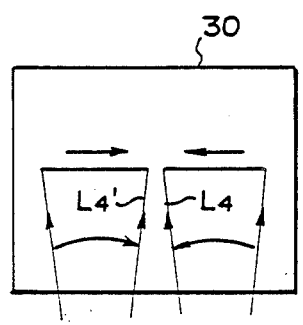
Figure 15:
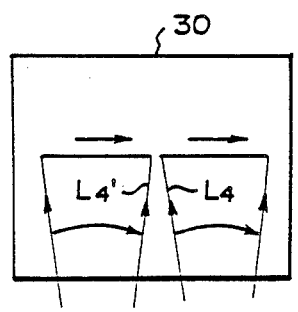

The embodiment shown in FIG. 12 is constituted so that, as shown in FIG. 13, the scanning start extremities Ls and Ls' of the radiated optical waves L4 and L4' are close to each other on the scanning surface 30. However, in accordance with the layout of the IDT 317 and the IDT 318 and the condition of sweeping of the alternating voltage applied to the IDT 317 and the IDT 318, the scanning end extremities of the radiated optical waves L4 and L4' may be close to each other as shown in FIG. 14, or the scanning start extremity of one of the radiated optical waves L4 and L4' may be close to the scanning end extremity of the other of the radiated optical waves L4 and L4' as shown in FIG. 15.

Figure 16:
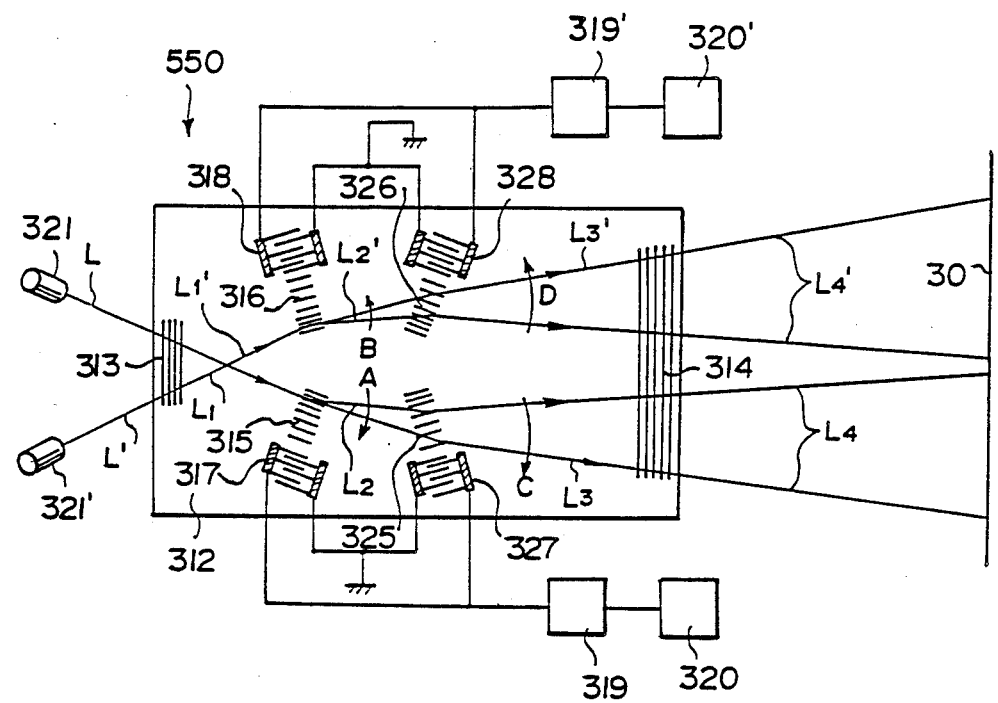
FIG. 16 is a schematic plan view showing an embodiment of the fifth optical deflecting apparatus in accordance with the present invention.

An embodiment of the fifth optical deflecting apparatus in accordance with the present invention will be described hereinbelow with reference to FIG. 16. In FIG. 16, similar elements are numbered with the same reference numerals with respect to FIG. 10.

In an optical deflecting apparatus 550, the first tilted-finger chirped IDT 317, the second tilted-finger chirped IDT 318, the third tilted-finger chirped IDT 327, and the fourth tilted-finger chirped IDT 328 are disposed so that the optical waves L4 and L4' radiated out of the optical waveguide 312 do not overlap each other on the scanning surface 30. Therefore, main scanning lines are formed independently by the radiated optical waves L4 and L4' on the scanning surface 30. Accordingly, as in the case of the optical deflecting apparatus 510, recording or reading of two images can be carried out simultaneously by use of the optical deflecting apparatus 550.

As mentioned above for the embodiment shown in FIG. 10, with the optical deflecting apparatus 550, each of the deflection angle ranges $\Delta\delta$ and $\Delta\delta'$ of the radiated optical waves L4 and L4' can be substantially increased to two times as compared with the fourth optical deflecting apparatus 510 wherein the optical wave L is deflected by the single surface acoustic wave 315 and the optical wave L' is deflected by the single surface acoustic wave 316. Therefore, with the optical deflecting apparatus 550, an optical wave scanning width larger than with the optical deflecting apparatus 510 can be obtained, and larger images can be recorded or read.

The optical deflecting apparatus 550 may be modified in various manners as mentioned with reference to the optical deflecting apparatus 350 shown in FIG. 10, and the configuration as shown in FIG. 11 may be employed.

The fourth and fifth optical deflecting apparatuses in accordance with the present invention may also be constituted so that three or more optical waves are guided inside of the optical waveguide and diffracted and deflected by the surface acoustic waves, and the three or more optical waves diffracted and radiated out of the optical waveguide scan without overlapping one another on the predetermined surface. In such an optical deflecting apparatus, the means for diffracting and deflecting the two adjacent optical waves can be constituted in the same manner as mentioned above. Therefore, the optical deflecting apparatus of this type is also embraced in the scope of the fourth and fifth optical deflecting apparatuses in accordance with the present invention.

I claim:

1. An optical deflecting apparatus comprising a plurality of optical deflectors, each of which is provided with:

(i) an optical waveguide formed of a material allowing propagation of surface acoustic waves therethrough, (ii) a first surface acoustic wave generating means for generating a first surface acoustic wave, which advances in a direction intersecting an optical path of a guided optical wave advancing inside of said optical waveguide and diffracts and deflects said guided optical wave, in said optical waveguide, and (iii) a second surface acoustic wave generating means for generating a second surface acoustic wave, which advances in a direction intersecting the optical path of said guided and diffracted optical wave and diffracts and deflects said guided and diffracted optical wave in a direction that amplifies the deflection caused by said diffraction, in said optical waveguide, wherein said first surface acoustic wave generating means and said second surface acoustic wave generating means are formed to continuously change the frequencies of said first surface acoustic wave and said second surface acoustic wave and the directions of advance thereof while satisfying the conditions of lk1+lK1=lk2, and lk2+lK2=lk3 wherein lk1 and lk2 respectively denote wave vectors of the guided optical wave before and after being diffracted by said first surface acoustic wave, lk3 denotes a save vector of the guided optical wave after being diffracted by said second surface acoustic wave, and lK1 and lK2 respectively denote wave vectors of said first surface acoustic wave and said second surface acoustic wave, said optical waveguides of said optical deflectors being disposed so that the optical waves radiated out of said optical waveguides scan in a line with respect to each other on a predetermined surface, and scanning extremities of the adjacent radiated optical waves adjoin each other.

2. An apparatus as defined in claim 1 wherein each of said first surface acoustic wave generating means and said second surface acoustic wave generating means comprises a tilted-finger chirped interdigital transducer, in which transducer finger intervals are changed stepwise and the directions of the transducer fingers are changed stepwise, and a driver for applying an alternating voltage the frequency of which changes continuously to said tilted-finger chirped interdigital transducer.

3. An apparatus as defined in claim 1 wherein each of said first surface acoustic wave generating means and said second surface acoustic wave generating means comprises a curved-finger interdigital transducer, in which transducer finger intervals are changed stepwise and the respective transducer fingers are in a circular arc shape, and a driver for applying an alternating voltage the frequency of which changes continuously to said curved-finger chirped interdigital transducer.

4. An apparatus as defined in claim 2 wherein said first surface acoustic wave generating means and said second surface acoustic wave generating means are constituted to generate surface acoustic waves the frequencies of which change while attaining values equal to each other in a frequency range of f1 to f2, wherein f2=2f1, said chirped interdigital transducer which constitutes said first surface acoustic wave generating means is formed so that a transducer finger at a portion for generating said first surface acoustic wave having the frequency f1 makes an angle of $\theta/2$ with respect to a direction of advance of a guided optical wave L1 incident upon said first surface acoustic wave, wherein $\theta$ denotes an angle of incidence of said guided optical wave L1 with respect to said first surface acoustic wave having the frequency f2, and said chirped interdigital transducer which constitutes said second surface acoustic wave generating means is formed so that the transducer fingers at portions for generating said second surface acoustic wave having the frequency f2 and said second surface acoustic wave having the frequency f1 respectively make an angle of $3\theta$ and an angle of $3\theta/2$ with respect to the direction of advance of said guided optical wave L1.

5. An apparatus as defined in claim 3 wherein said first surface acoustic wave generating means and said second surface acoustic wave generating means are constituted to generate surface acoustic waves the frequencies of which change while attaining values equal to each other in a frequency range of f1 to f2, wherein f2=2f1, said curved-finger interdigital transducer which constitutes said first surface acoustic wave generating means is formed so that a transducer finger at a portion for generating said first surface acoustic wave having the frequency f1 makes an angle of $\theta/2$ with respect to a direction of advance of a guided optical wave L1 incident upon said first surface acoustic wave, wherein $\theta$ denotes the angle of incidence of said guided optical wave L1 with respect to said first surface acoustic wave having the frequency f2, and said curved-finger interdigital transducer which constitutes said second surface acoustic wave generating means is formed so that the transducer fingers at portions for generating said second surface acoustic wave having the frequency f2 and said second surface acoustic wave having the frequency f1 respectively make an angle of $3\theta$ and an angle of $3\theta/2$ with respect to the direction of advance of said guided optical wave L1.

6. An apparatus as defined in claim 4 or 5 wherein said interdigital transducers which respectively constitute said first surface acoustic wave generating means and said second surface acoustic wave generating means are operated by a single common driver.

7. An optical deflecting apparatus comprising:

(i) an optical waveguide formed of a material allowing propagation of surface acoustic waves therethrough, (ii) a first surface acoustic wave generating means for generating a first surface acoustic wave, which advances in a direction intersecting an optical path of a first guided optical wave advancing inside of said optical waveguide and diffracts and deflects said first guided optical wave, in said optical waveguide, and (iii) a second surface acoustic wave generating means for generating a second surface acoustic wave, which advances in a direction intersecting an optical path of a second guided optical wave advancing inside of said optical waveguide and diffracts and deflects said second guided optical wave, in said optical waveguide, wherein said first surface acoustic wave generating means and said second surface acoustic wave generating means are disposed so that said first guided optical wave and said second guided optical wave radiated out of said optical waveguide scan in a line with respect to each other on a predetermined surface, and a scanning extremity of said first guided and radiated optical wave adjoin a scanning extremity of said second guided and radiated optical wave.

8. An apparatus as defined in claim 7 wherein each of said first surface acoustic wave generating means and said second surface acoustic wave generating means comprises a tilted-finger chirped interdigital transducer, in which transducer finger intervals are changed stepwise and the directions of the transducer fingers are changed stepwise, and a driver for applying an alternating voltage the frequency of which changes continuously to said tilted-finger chirped interdigital transducer.

9. An apparatus as defined in claim 7 wherein each of said first surface acoustic wave generating means and said second surface acoustic wave generating means comprises a curved-finger interdigital transducer, in which transducer finger intervals are changed stepwise and the respective transducer fingers are in a circular arc shape, and a driver for applying an alternating voltage the frequency of which changes continuously to said curved-finger chirped interdigital transducer.

10. An optical deflecting apparatus comprising:
 (i) an optical waveguide formed of a material allowing propagation of surface acoustic waves therethrough,
 (ii) a first surface acoustic wave generating means for generating a first surface acoustic wave, which advances in a direction intersecting an optical path of a first guided optical wave advancing inside of said optical waveguide and diffracts and deflects said first guided optical wave, in said optical waveguide,
 (iii) a second surface acoustic wave generating means for generating a second surface acoustic wave, which advances in a direction intersecting an optical path of a second guided optical wave advancing inside of said optical waveguide and diffracts and deflects said second guided optical wave, in said optical waveguide,
 (iv) a third surface acoustic wave generating means for generating a third surface acoustic wave, which advances in a direction intersecting the optical path of said first guided optical wave diffracted by said first surface acoustic wave and diffracts and deflects said first guided and diffracted optical wave in a direction that amplifies the deflection caused by said diffraction, in said optical waveguide, and
 (v) a fourth surface acoustic wave generating means for generating a fourth surface acoustic wave, which advances in a direction intersecting the optical path of said second guided optical wave diffracted by said second surface acoustic wave and diffracts and deflects said second guided and diffracted optical wave in a direction that amplifies the deflection caused by said diffraction, in said optical waveguide,
 wherein said first surface acoustic wave generating means and said third surface acoustic wave generating means are formed to continuously change the frequencies of said first surface acoustic wave and said third surface acoustic wave and the directions of advance thereof while satisfying the conditions of $$lk1 + lK1 = lk2, \text{ and}$$

$$lk2 + lK2 = lk3$$

wherein $lk1$ and $lk2$ respectively denote wave vectors of said first guided optical wave before and after being diffracted by said first surface acoustic wave, $lk3$ denotes a wave vector of said first guided optical wave after being diffracted by said third surface acoustic wave, and $lK1$ and $lK2$ respectively denote wave vectors of said first surface acoustic wave and said third surface acoustic wave, said second surface acoustic wave generating means and said fourth surface acoustic wave generating means are formed to continuously change the frequencies of said second surface acoustic wave and said fourth surface acoustic wave and the directions of advance thereof while satisfying the conditions of $$lk4 + lK3 = lk5, \text{ and}$$

$$lk5 + lK4 = lk6$$

wherein $lk4$ and $lk5$ respectively denote wave vectors of said second guided optical wave before and after being diffracted by said second surface acoustic wave, $lk6$ denotes a wave rector of said second guided optical wave after being diffracted by said fourth surface acoustic wave, and $lK3$ and $lK4$ respectively denote wave vectors of said second surface acoustic wave and said fourth surface acoustic wave, and said first surface acoustic wave generating means, said second surface acoustic wave generating means, said third surface acoustic wave generating means, and said fourth surface acoustic wave generating means are disposed so that said first guided optical wave and said second guided optical wave radiated out of said optical waveguide scan in a line with respect to each other on a predetermined surface, and a scanning extremity of said first guided and radiated optical wave adjoin a scanning extremity of said second guided and radiated optical wave.

11. An apparatus as defined in claim 10 wherein each of said first surface acoustic wave generating means, said second surface acoustic wave generating means, said third surface acoustic wave generating means, and said fourth surface acoustic wave generating means comprises a tilted-finger chirped interdigital transducer, in which transducer finger intervals are changed stepwise and the directions of the transducer fingers are changed stepwise, and a driver for applying an alternating voltage the frequency of which changes continuously to said tilted-finger chirped interdigital transducer.

12. An apparatus as defined in claim 10 wherein each of said first surface acoustic wave generating means, said second surface acoustic wave generating means, said third surface acoustic wave generating means, and said fourth surface acoustic wave generating means comprises a curved-finger interdigital transducer, in which transducer finger intervals are changed stepwise and the respective transducer fingers are in a circular arc shape, and a driver for applying an alternating voltage the frequency of which changes continuously to said curved-finger chirped interdigital transducer.

13. An apparatus as defined in claim 11 wherein the m'th surface acoustic wave generating means and the m+2'th surface acoustic wave generating means, where m=1 and/or 2, are constituted to generate surface acoustic waves the frequencies of which change while attaining values equal to each other in a frequency range of f1 to f2, wherein f2≈2f1, said chirped interdigital transducer which constitutes said m'th surface acoustic wave generating means is formed so that a transducer finger at a portion for generating said surface acoustic wave having the frequency f1 makes an angle of $\eta/2$ with respect to a direction of advance of an m'th guided optical wave L1 incident upon said m'th surface acoustic wave, wherein $\theta$ denotes an angle of incidence of said guided optical wave L1 with respect to said m'th surface acoustic wave having the frequency f2, and said chirped interdigital transducer which constitutes said m+2'th surface acoustic wave generating means is formed so that the transducer fingers at portions for generating said surface acoustic wave having the frequency f2 and said surface acoustic wave having the frequency f1 respectively make an angle of $3\theta$ and an angle of $3\theta/2$ with respect to the direction of advance of said guided optical wave L1.

14. An apparatus as defined in claim 12 wherein the m'th surface acoustic wave generating means and the m+2'th surface acoustic wave generating means, where m=1 and/or 2, are constituted to generate surface acoustic waves the frequencies of which change while attaining values equal to each other in a frequency range of f1 to f2, wherein f2=2f1, said curved-finger interdigital transducer which constitutes said m'th surface acoustic wave generating means is formed so that a transducer finger at a portion for generating said surface acoustic wave having the frequency f1 makes an angle of $\theta/2$ with respect to a direction of advance of an m'th guided optical wave L1 incident upon said m'th surface acoustic wave, wherein $\theta$ denotes an angle of incidence of said guided optical wave L1 with respect to said m'th surface acoustic wave having the frequency f2, and said curved-finger interdigital transducer which constitutes said m+2'th surface acoustic wave generating means is formed so that the transducer fingers at portions for generating said surface acoustic wave having the frequency f2 and said surface acoustic wave having the frequency f1 respectively make an angle of $3\theta$ and an angle of $3\theta/2$ with respect to the direction of advance of said guided optical wave L1.

15. An apparatus as defined in claim 13 or 14 wherein said interdigital transducers which respectively constitute said m'th surface acoustic wave generating means and said m+2'th surface acoustic wave generating means are operated by a single common driver.

16. An optical deflecting apparatus comprising:
 (i) an optical waveguide formed of a material allowing propagation of surface acoustic waves therethrough,
 (ii) a first surface acoustic wave generating means for generating a first surface acoustic wave, which advances in a direction intersecting an optical path of a first guided optical wave advancing inside of said optical waveguide and diffracts and deflects said first guided optical wave, in said optical waveguide, and
 (iii) a second surface acoustic wave generating means for generating a second surface acoustic wave, which advances in a direction intersecting an optical path of a second guided optical wave advancing inside of said optical waveguide and diffracts and deflects said second guided optical wave, in said optical waveguide,
    wherein said first surface acoustic wave generating means and said second surface acoustic wave generating means are disposed so that said first guided optical wave and said second guided optical wave radiated out of said optical waveguide scan without overlapping each other on a predetermined surface.

17. An apparatus as defined in claim 16 wherein each of said first surface acoustic wave generating means and said second surface acoustic wave generating means comprises a tilted-finger chirped interdigital transducer, in which transducer finger intervals are changed stepwise and the directions of the transducer fingers are changed stepwise, and a driver for applying an alternating voltage the frequency of which changes continuously to said tilted-finger chirped interdigital transducer.

18. An apparatus as defined in claim 16 wherein each of said first surface acoustic wave generating means and said second surface acoustic wave generating means comprises a curved-finger interdigital transducer, in which transducer finger intervals are changed stepwise and the respective transducer fingers are in a circular arc shape, and a driver for applying an alternating voltage the frequency of which changes continuously to said curved-finger chirped interdigital transducer.

19. An optical deflecting apparatus comprising:
 (i) an optical waveguide formed of a material allowing propagation of surface acoustic waves therethrough,
 (ii) a first surface acoustic wave generating means for generating a first surface acoustic wave, which advances in a direction intersecting an optical path of a first guided optical wave advancing inside of said optical waveguide and diffracts and deflects said first guided optical wave, in said optical waveguide,
 (iii) a second surface acoustic wave generating means for generating a second surface acoustic wave, which advances in a direction intersecting an optical path of a second guided optical wave advancing inside of said optical waveguide and diffracts and deflects said second guided optical wave, in said optical waveguide,
 (iv) a third surface acoustic wave generating means for generating a third surface acoustic wave, which advances in a direction intersecting the optical path of said first guided optical wave diffracted by said first surface acoustic wave and diffracts and deflects said first guided and diffracted optical wave in a direction that amplifies the deflection caused by said diffraction, in said optical waveguide, and
 (v) a fourth surface acoustic wave generating means for generating a fourth surface acoustic wave, which advances in a direction intersecting the optical path of said second guided optical wave diffracted by said second surface acoustic wave and diffracts and deflects said second guided and diffracted optical wave in a direction that amplifies the deflection caused by said diffraction, in said optical waveguide, wherein said first surface acoustic wave generating means and said third surface acoustic wave generating means are formed to continuously change the frequencies of said first surface acoustic wave and said third surface acoustic wave and the directions of advance thereof while satisfying the conditions of lk1+lK1=lk2, and lk2+lK2=lk3 wherein lk1 and lk2 respectively denote wave vectors of said first guided optical wave before and after being diffracted by said first surface acoustic wave, lk3 denotes a wave vector of said first guided optical wave after being diffracted by said third surface acoustic wave, and lK1 and lK2 respectively denote wave vectors of said first surface acoustic wave and said third surface acoustic wave, said second surface acoustic wave generating means and said fourth surface acoustic wave generating means are formed to continuously change the frequencies of said second surface acoustic wave and said fourth surface acoustic wave and the directions of advance thereof while satisfying the conditions of lk4+lK3=lk5, and lk5+lK4=lk6 wherein lk4 and lk5 respectively denote wave vectors of said second guided optical wave before and after being diffracted by said second surface acoustic wave, lk6 denotes a wave vector of said second guided optical wave after being diffracted by said fourth surface acoustic wave, and lK3 and lK4 respectively denote wave vectors of said second surface acoustic wave and said fourth surface acoustic wave, and said first surface acoustic wave generating means, said second surface acoustic wave generating means, said third surface acoustic wave generating means, and said fourth surface acoustic wave generating means are disposed so that said first guided optical wave and said second guided optical wave radiated out of said optical waveguide scan without overlapping each other on a predetermined surface.

20. An apparatus as defined in claim 19 wherein each of said first surface acoustic wave generating means, said second surface acoustic wave generating means, said third surface acoustic wave generating means, and said fourth surface acoustic wave generating means comprises a tilted-finger chirped interdigital transducer, in which transducer finger intervals are changed stepwise and the directions of the transducer fingers are changed stepwise, and a driver for applying an alternating voltage the frequency of which changes continuously to said tilted-finger chirped interdigital transducer.

21. An apparatus as defined in claim 19 wherein each of said first surface acoustic wave generating means, said second surface acoustic wave generating means, said third surface acoustic wave generating means, and said fourth surface acoustic wave generating means comprises a curved-finger interdigital transducer, in which transducer finger intervals are changed stepwise and the respective transducer fingers are in a circular arc shape, and a driver for applying an alternating voltage the frequency of which changes continuously to said curved-finger chirped interdigital transducer.

22. An apparatus as defined in claim 20 wherein the m'th surface acoustic wave generating means and the m+2'th surface acoustic wave generating means, where m=1, and/or 2, are constituted to generate surface acoustic waves the frequencies of which change while attaining values equal to each other in a frequency range of f1 to f2, wherein f2=2f1, said chirped interdigital transducer which constitutes said m'th surface acoustic wave generating means is formed so that a transducer finger at a portion for generating said surface acoustic wave having the frequency f1 makes an angle of $\theta/2$ with respect to a direction of advance of an m'th guided optical wave L1 incident upon said m'th surface acoustic wave, wherein $\theta$ denotes an angle of incidence of said guided optical wave L1 with respect to said m'th surface acoustic wave having the frequency f2, and said chirped interdigital transducer which constitutes said m+2'th surface acoustic wave generating means is formed so that the transducer fingers at portions for generating said surface acoustic wave having the frequency f2 and said surface acoustic wave having the frequency f1 respectively make an angle of $3\theta$ and an angle of $3\theta/2$ with respect to the direction of advance of said guided optical wave L1.

23. An apparatus as defined in claim 21 wherein the m'th surface acoustic wave generating means and the m+2'th surface acoustic wave generating means, where m=1 and/or 2, are constituted to generate surface acoustic waves the frequencies of which change while attaining values equal to each other in a frequency range of f1 to f2, wherein f2≈2f1, said curved-finger interdigital transducer which constitutes said m'th surface acoustic wave generating means is formed so that a transducer finger at a portion for generating said surface acoustic wave having the frequency f1 makes an angle of $\theta/2$ with respect to a direction of m'th surface acoustic wave, wherein $\theta$ denotes an angle of incidence of said guided optical wave L1 with respect to said m'th surface acoustic wave having the frequency f2, and said curved-finger interdigital transducer which constitutes said m+2'th surface acoustic wave generating means is formed so that the transducer fingers at portions for generating said surface acoustic wave having the frequency f2 and said surface acoustic wave having the frequency f1 respectively make an angle of 3$\theta$ and an angle of $3\theta/2$ with respect to the direction of advance of said guided optical wave L1.

24. An apparatus as defined in claim 22 or 23 wherein said interdigital transducers which respectively constitute said m'th surface acoustic wave generating means and said m+2'th surface acoustic wave generating means are operated by a single common driver.

* * * * *